United States Patent
Ota et al.

(10) Patent No.: US 6,236,682 B1
(45) Date of Patent: May 22, 2001

(54) VIDEO MOTION VECTOR DETECTION INCLUDING ROTATION AND/OR ZOOM VECTOR GENERATION

(75) Inventors: Takaaki Ota, Englewood; Mark Schaffer, Hackensack, both of NJ (US)

(73) Assignees: Sony Corporation, Tokyo (JP); Sony Corporation of America, Park Ridge, NJ (US)

( * ) Notice: Subject to any disclaimer, the term of this patent is extended or adjusted under 35 U.S.C. 154(b) by 0 days.

(21) Appl. No.: 08/027,783

(22) Filed: Mar. 8, 1993

(51) Int. Cl.$^7$ .................................................. H04N 7/12
(52) U.S. Cl. ...................... 375/240.16; 348/699
(58) Field of Search ................... 348/400, 401, 348/402, 409, 412, 413, 384, 387, 390, 208, 700, 416, 699, 421, 416.1, 402.1, 407.1, 413.1, 710; 382/41; 375/240.16, 240.17

(56) References Cited

U.S. PATENT DOCUMENTS

| | | | |
|---|---|---|---|
| 4,816,906 | * 3/1989 | Kummerfeldt et al. | 348/402 |
| 4,908,874 | * 3/1990 | Gabriel | 382/41 |
| 4,980,762 | * 12/1990 | Heeger et al. | 348/700 |
| 5,067,015 | * 11/1991 | Combridge et al. | 348/421 |
| 5,200,820 | * 4/1993 | Gharavi | 348/413 |
| 5,235,419 | * 8/1993 | Krause | 348/700 |
| 5,259,040 | * 11/1993 | Hanna | 382/41 |
| 5,267,034 | * 11/1993 | Miyatake et al. | 348/208 |
| 5,291,300 | * 3/1994 | Ueda | 348/208 |
| 5,294,991 | * 3/1994 | Oshima et al. | 348/208 |
| 5,311,310 | * 5/1994 | Jozawa et al. | 348/699 |

OTHER PUBLICATIONS

"Video Compression Based on Camera Motion", Lari et al, pp. 1004–1010, © 1992.*

* cited by examiner

Primary Examiner—Vu Le
(74) Attorney, Agent, or Firm—Frommer Lawrence & Haug, LLP.; William S. Frommer

(57) ABSTRACT

Motion vectors from one video frame to another are detected by segmenting a present frame of video data into plural blocks and then comparing a block in the present frame to a corresponding block in a preceding frame to detect rotational and zoom movement of the present block relative to the preceding block, in addition to rectilinear movement.

58 Claims, 22 Drawing Sheets

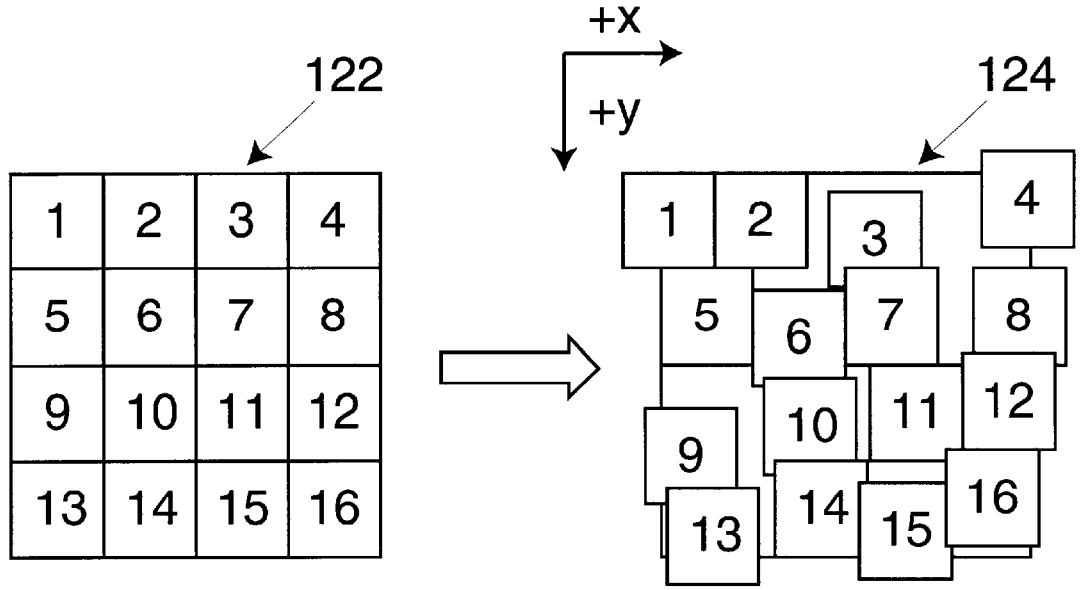
FIG. 2A  FIG. 2B
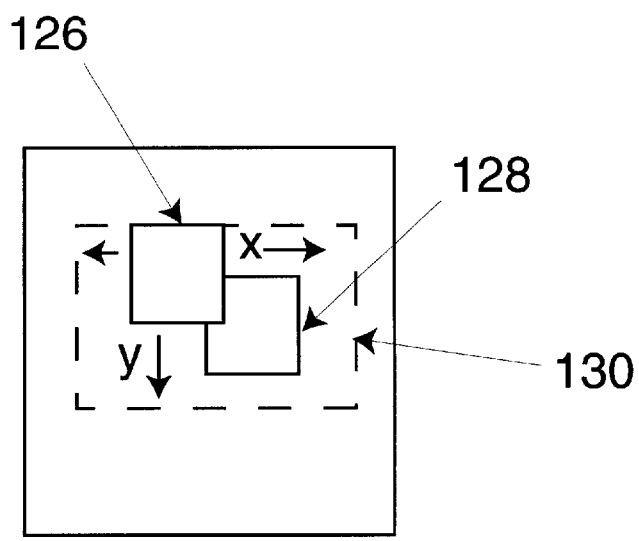
FIG. 2C

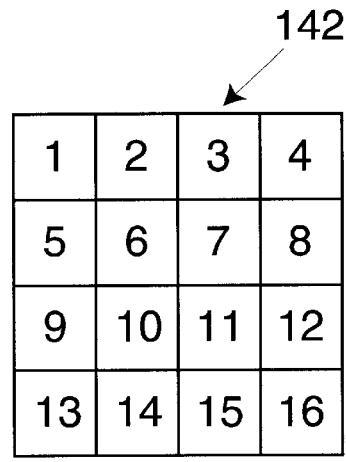
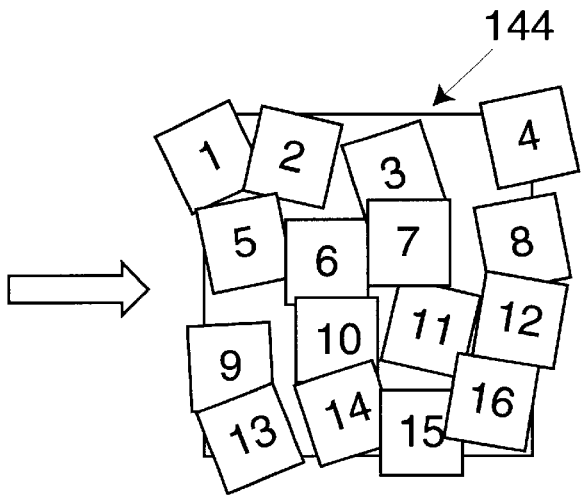
FIG. 3A  FIG. 3B
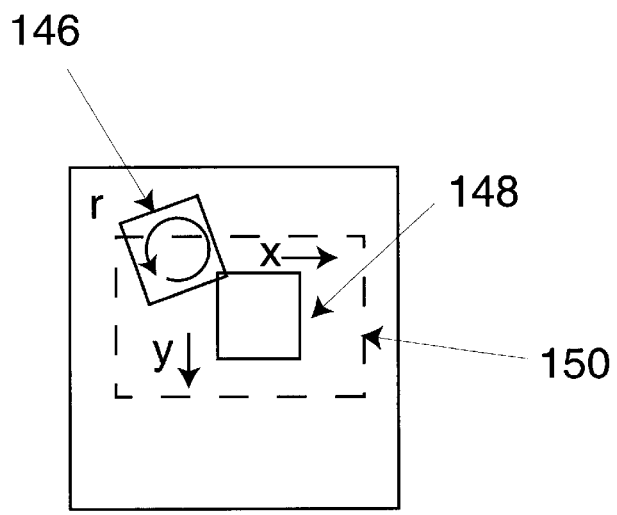
FIG. 3C

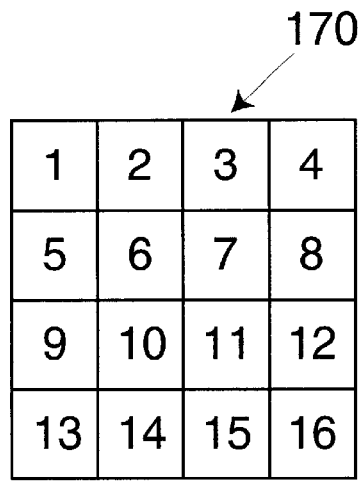
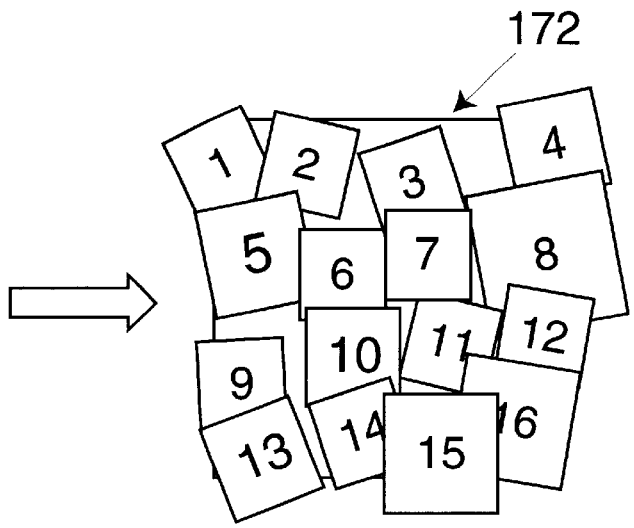
FIG. 5A  FIG. 5B
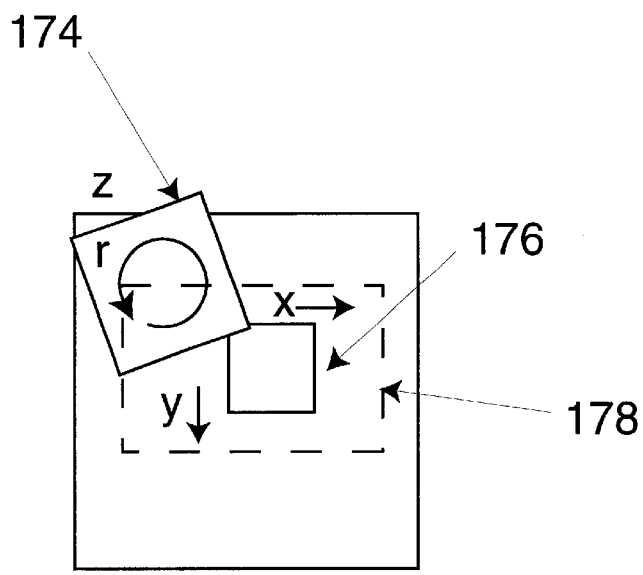
FIG. 5C

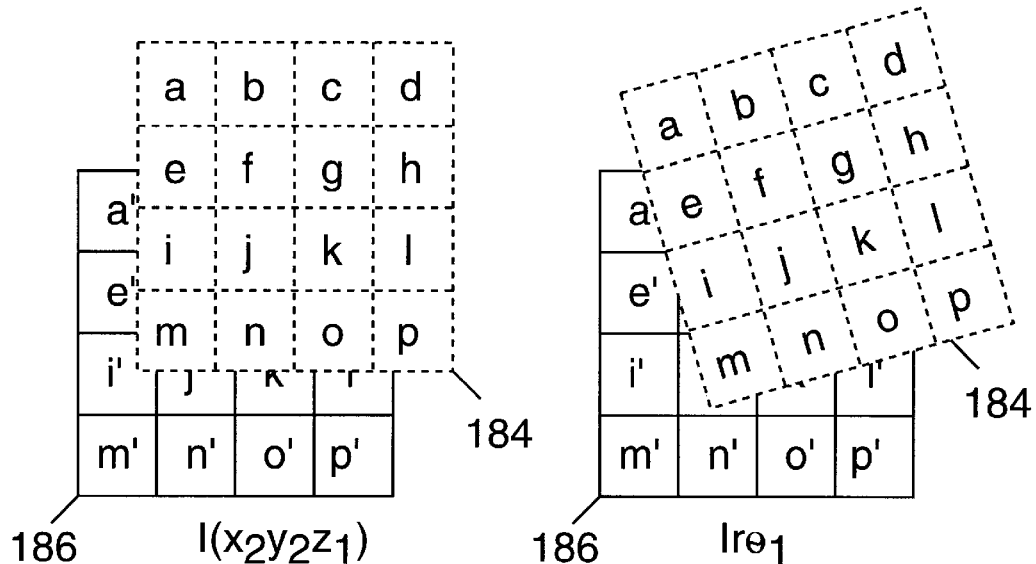
FIG. 6A  FIG. 6B
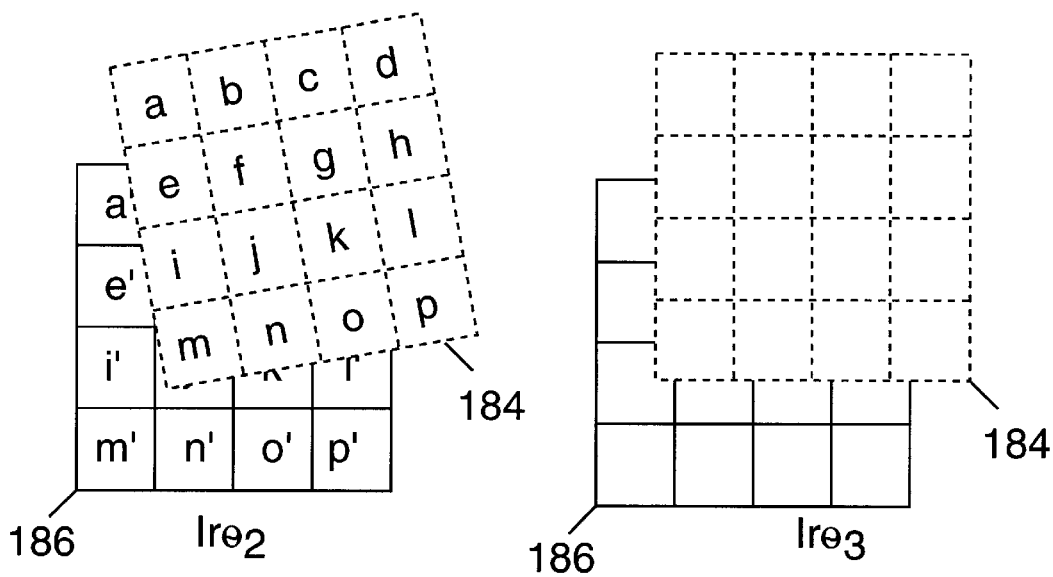
FIG. 6C  FIG. 6D

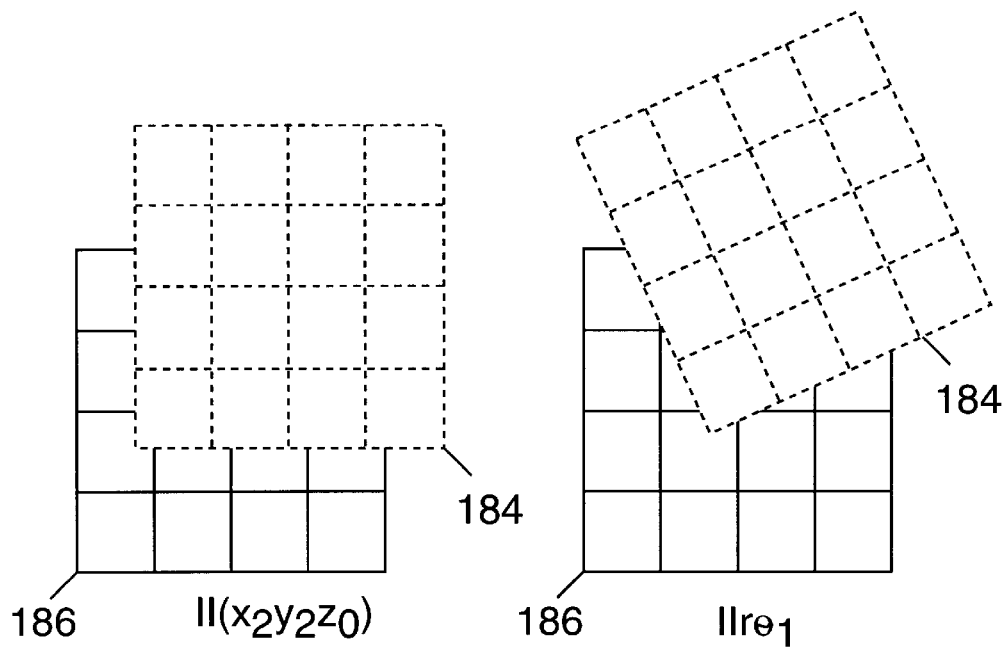
FIG. 7A          FIG. 7B
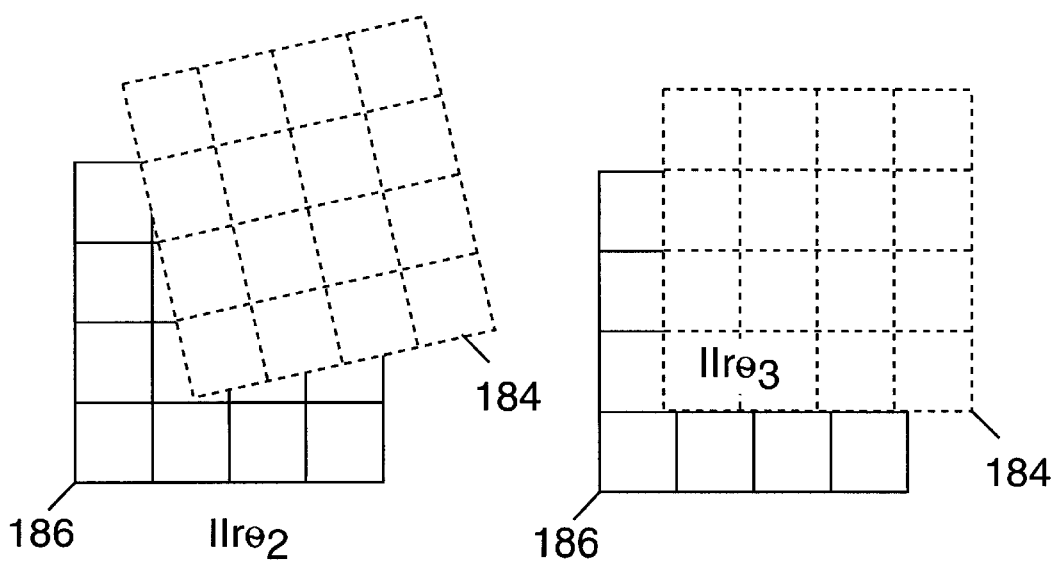
FIG. 7C          FIG. 7D

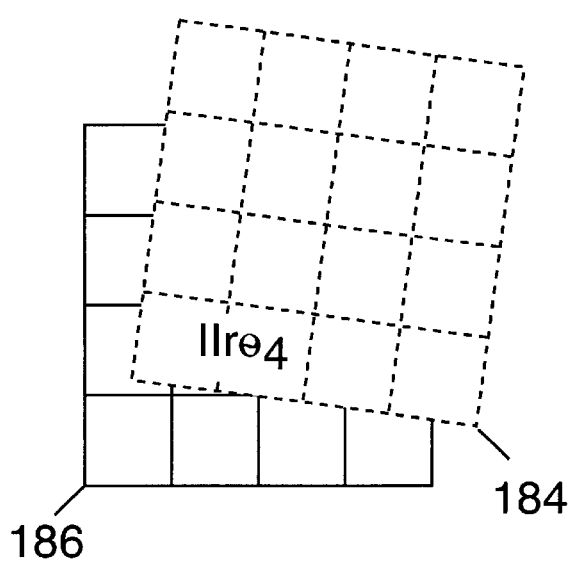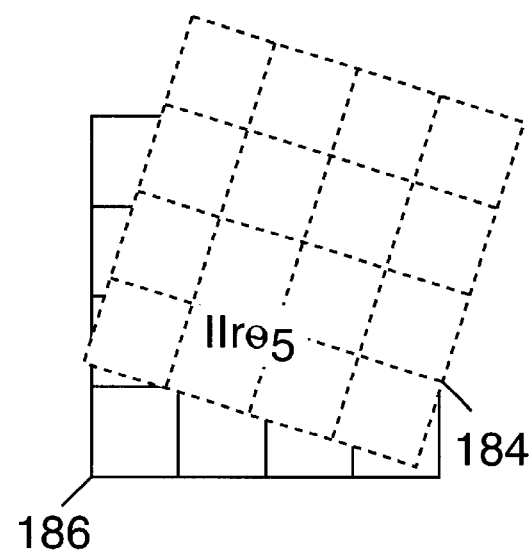
FIG. 7E  FIG. 7F

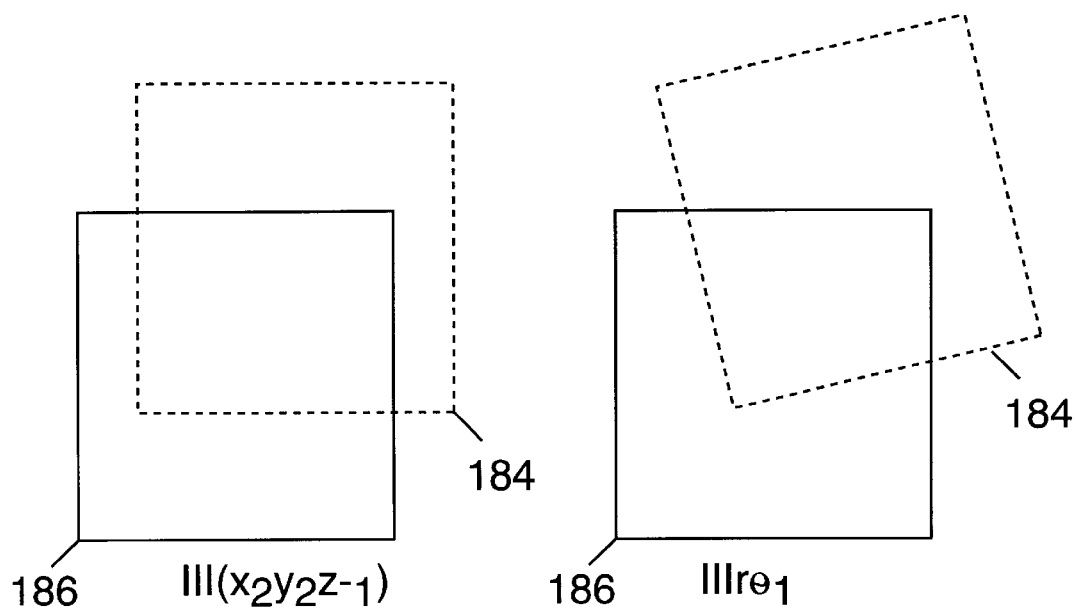
FIG. 8A  FIG. 8B
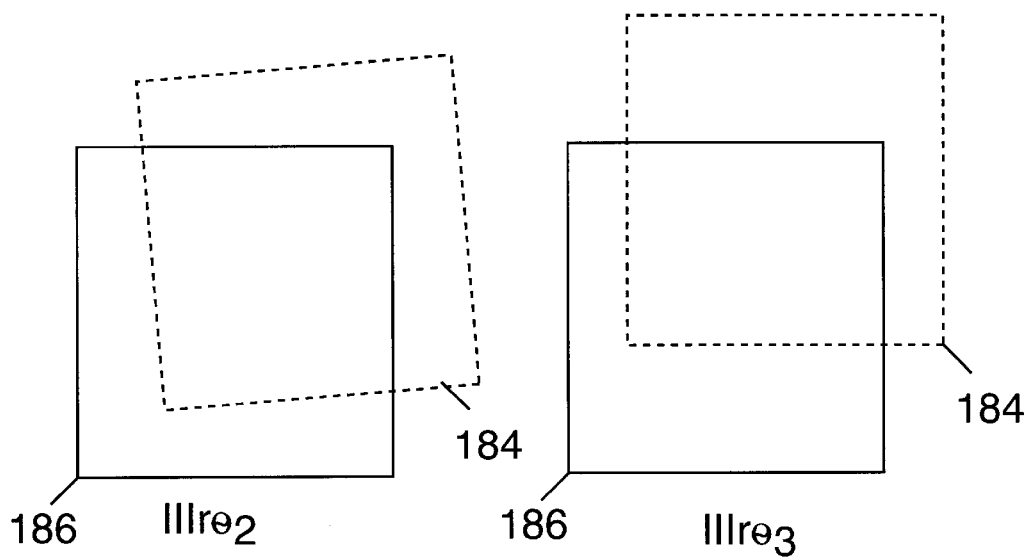
FIG. 8C  FIG. 8D

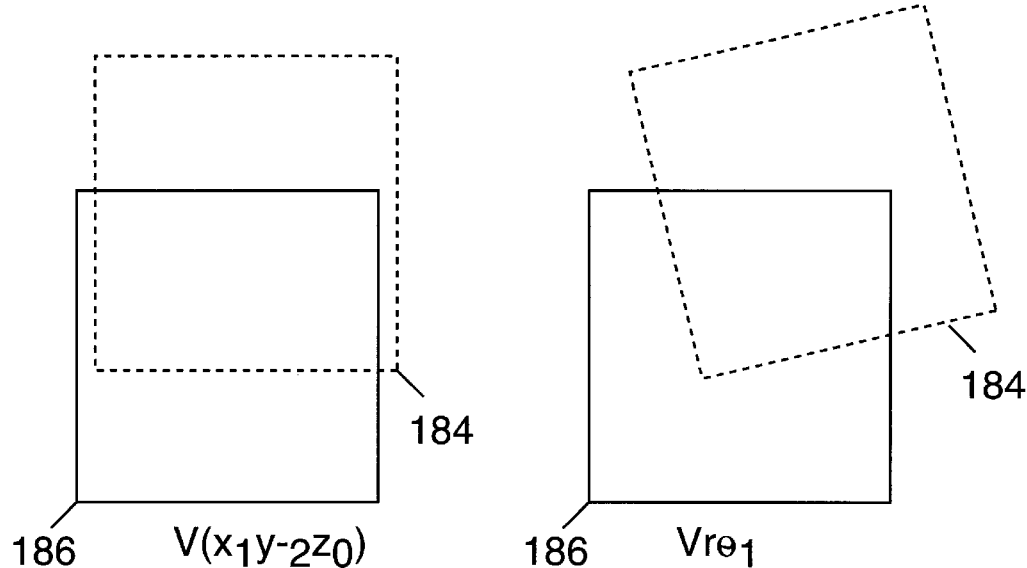
FIG. 10A      FIG. 10B
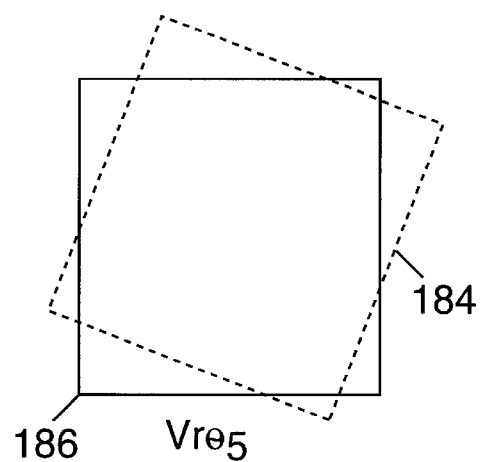
FIG. 10C

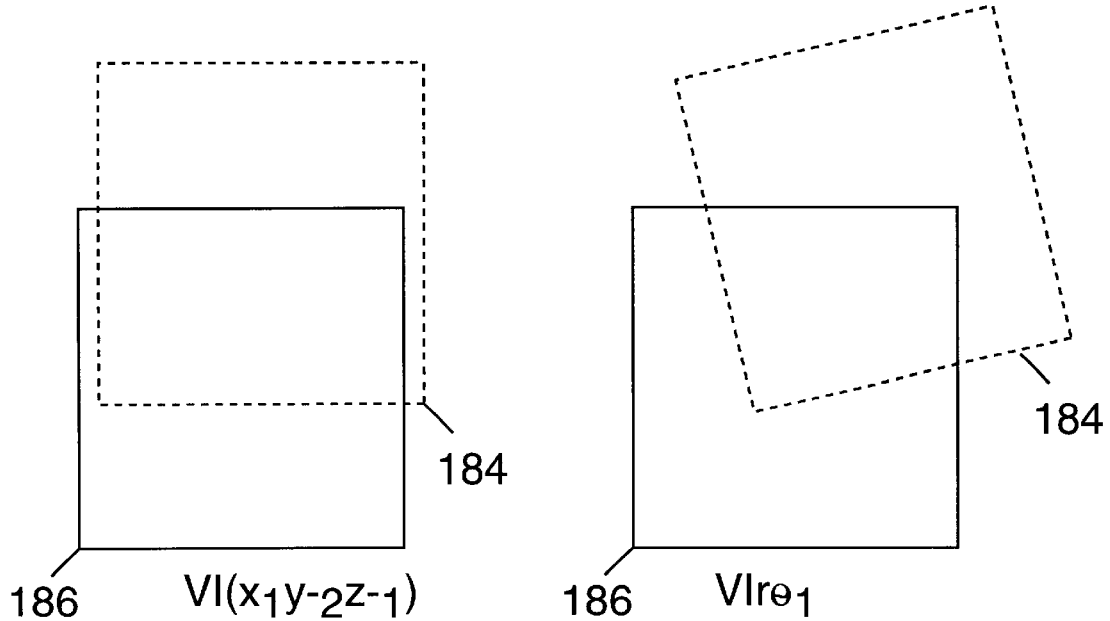
FIG. 11A   FIG. 11B
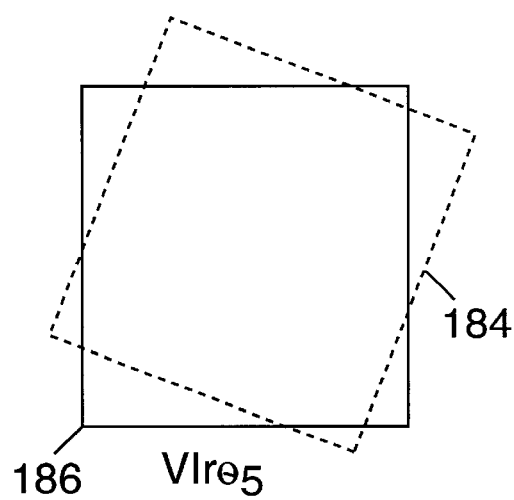
FIG. 11C

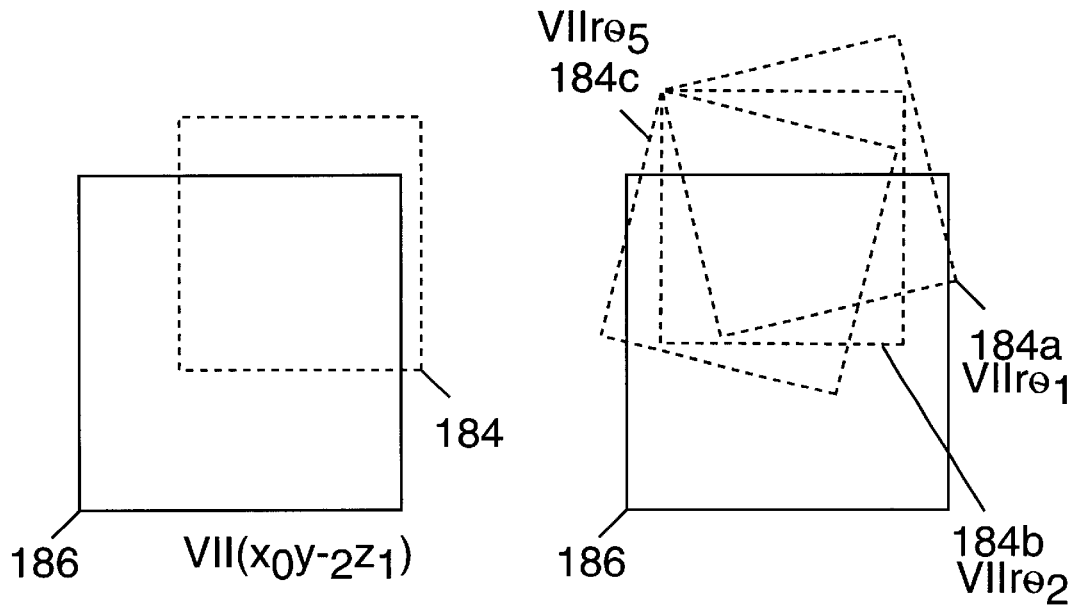
FIG. 12A  FIG. 12B
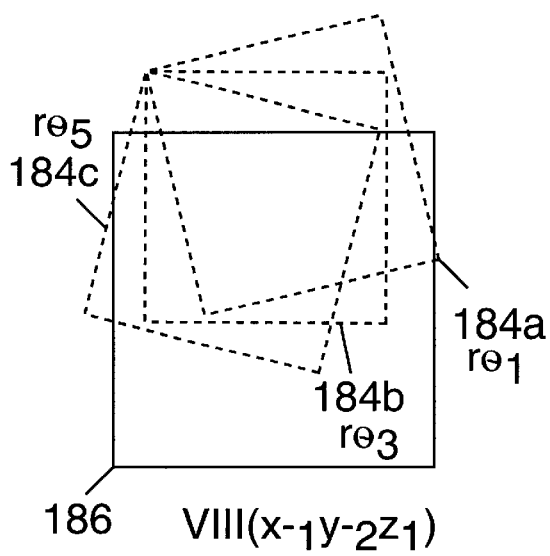
FIG. 13

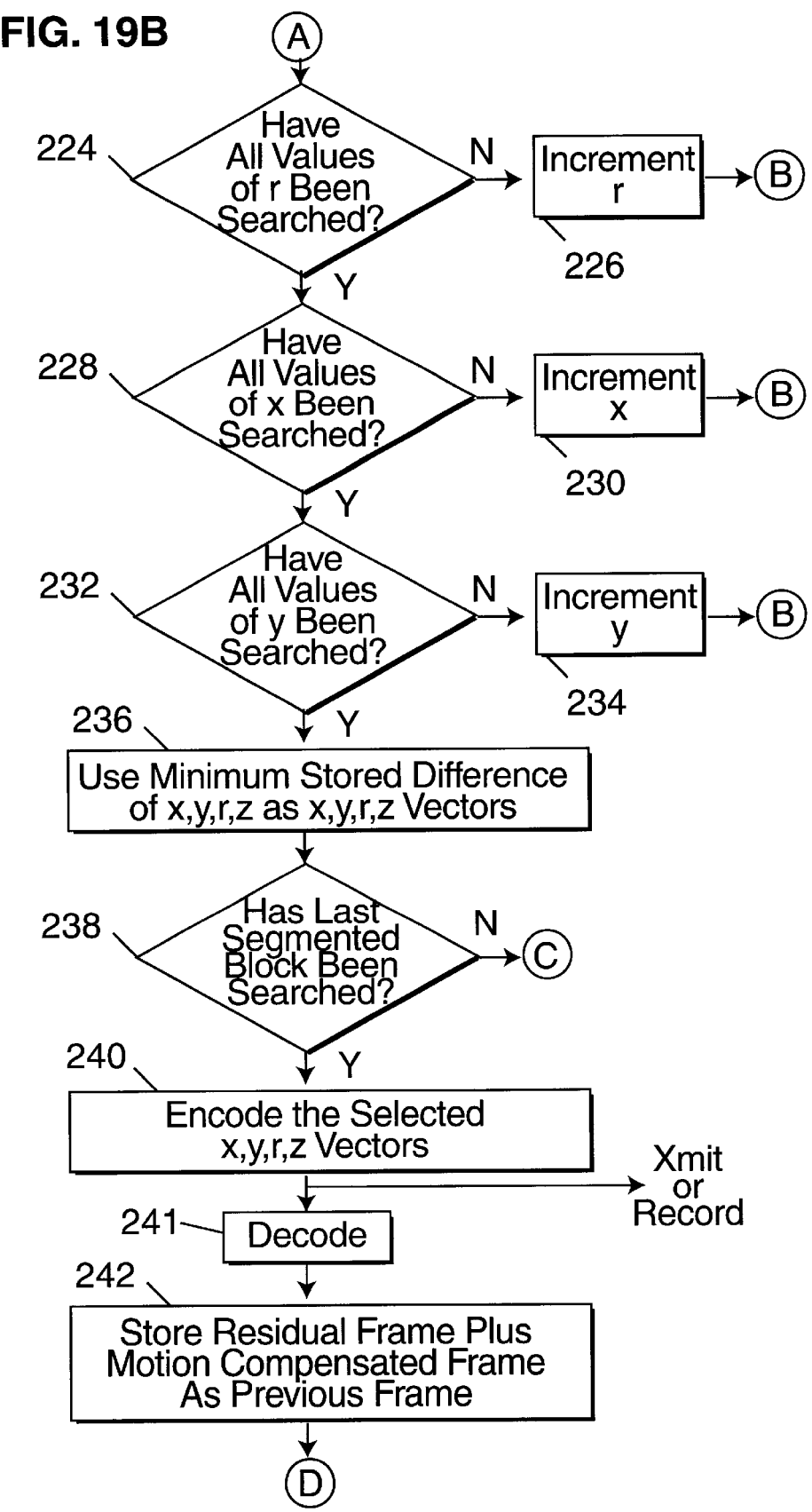

VIDEO MOTION VECTOR DETECTION INCLUDING ROTATION AND/OR ZOOM VECTOR GENERATION

BACKGROUND OF THE INVENTION

This invention relates to video compression and, more particularly, to the detection and generation of motion vectors which describe the movement of video picture information from one video frame to another, namely rotational and zoom movement.

The transmission and recording of video information, such as television signals, in digital form generally requires a large amount of digital information to assure the accurate reproduction of high quality video pictures. As an example, if each video frame of picture information is digitized, approximately 250 Mbps are needed. With the advent of high definition television (HDTV), the amount of information needed to reproduce an HDTV picture is significantly increased. In addition, proposed digital standards for high fidelity sound reproduction are expected to be satisfied by still additional digital data, resulting in an anticipated transmission (or data transfer) rate in a digital video system to be on the order of about 1000 Mbps.

The foregoing data requirements have made it impractical to digitize, on a frame-by-frame basis, all of the video information included in each frame of a video picture. Moreover, and recognizing that the video information contained in one video frame of a particular scene is quite similar to (and in many cases almost identical to) the video information included in an immediately preceding frame, it is appreciated that the complete digitization of a video frame consists, to a large degree, of redundant data. This redundancy suggests that a substantial savings in bandwidth and data transfer rate can be realized by relying upon data compression techniques. Two types of video compression processing have been proposed heretofore: intraframe compression, wherein the spatial redundancy within a given frame of video information can be exploited to reduce the amount of digital data needed to represent that frame; and interframe compression wherein the redundancy of information from one frame to the next can be exploited so that only digital data representing changes need be transmitted.

Various mathematical models have been proposed for eliminating spatial redundancy in a given frame. One technique which has proved to be quite successful and has been implemented by digital processing relies upon orthogonal transformation of the video information included in a video frame; such as discrete cosine transformation (DCT). As is known to those of ordinary skill in the art, DCT processing is carried out by segmenting a video frame of digitized video information, such as pixels, into blocks formed of n×n arrays of pixels and then taking the discrete cosine transformation of each block. DCT coefficients of different frequency components are produced and only those coefficients which exceed a threshold level are processed further. This results in a significant reduction of data needed to represent a video frame, with only a small sacrifice in picture quality that is not easily perceived by a viewer. Further compression is achieved by quantizing these DCT coefficients and then relying upon variable length encoding, such as Huffman coding, for still further data reduction or compression. As a result, the amount of data needed to represent a frame of video information, such as an HDTV frame, is significantly reduced.

Interframe encoding refers to the process by which only those changes in a new frame (referred to herein as a "present frame") relative to a preceding frame, such as the immediately preceding frame, are transmitted or recorded. If there is virtually no change between frames, only minimal data is needed to describe the present frame. However, if there is little resemblance of the new frame to the preceding frame, as will be the case when the first frame of a new scene is present, then the amount of data which may be needed to describe the present frame is so large that it would be more efficient simply to rely upon intraframe encoding to represent the present frame. Thus, in a practical transmission or recording system, intraframe and interframe encoding are used in an adaptive manner to achieve optimum reduction or compression of the digital data needed to represent a video frame. The frame-to-frame changes which are transmitted or recorded in interframe encoding generally represent localized movement in the video picture of the preceding frame which results in the present frame and such changes are referred to as motion vectors. As is understood, the addition of motion vectors to the digital data which describes a preceding video frame results in the present frame. The addition of motion vectors to a preceding video frame also is known as motion compensation or motion prediction. That is, a present frame may be "predicted" simply by adding motion vectors to the data which describes the preceding frame.

Conventional motion compensation operates by detecting rectilinear motion of a present frame relative to a preceding frame. That is, changes in the vertical and horizontal directions of, for example, the blocks which constitute a video frame are detected and used to predict the corresponding blocks of the present frame. However, such rectilinear motion compensation assumes that the objects in a preceding frame may move only in x and y directions. On the contrary, it has been found that the objects in a preceding frame may undergo rotational movement from that frame to the present frame. The generation of rectilinear motion vectors, that is, rectilinear motion compensation, often does not provide an accurate or acceptable indication of such rotational movement. Hence, the use of rectilinear motion vectors to describe rotational movement may not be satisfactory.

Another drawback in limiting motion compensation to rectilinear motion vectors is the inability to account for common camera techniques which often are used, such as zoom-in and zoom-out. When a zooming factor that is positive or greater than unity is used, that is, when a cameraman zooms in on a subject, the effective size of a given block in the present frame appears to increase relative to that same block in the preceding frame. Conversely, when the zooming factor is negative or less than unity, that is, when the cameraman zooms out on a subject, the apparent size of a given block in the present frame relative to that same block in the preceding frame seems to decrease. Similarly, the movement of a subject toward or away from the camera gives rise to a zooming effect. Rectilinear motion compensation does not account for this zooming factor. Hence, conventional two-dimensional motion compensation often does not provide a satisfactory reconstruction of a video picture which was produced with relatively simple video camera techniques, such as zoom-in or zoom-out.

OBJECTS OF THE INVENTION

Therefore, it is an object of the present invention to provide an improved technique for video compression which may be used to represent both conventional and HDTV video pictures.

Another object of this invention is to provide an improved interframe encoding technique.

A further object of this invention is to provide motion compensation which considers, in addition to rectilinear movement, rotational and zoom-in/zoom-out movement.

An additional object of this invention is to provide four-dimensional video motion compensation.

Yet another object of this invention is to provide a technique which detects a rotational motion vector from one video frame to the next.

Still another object of this invention is to provide a technique which detects a zoom vector from one video frame to the next.

Various other objects, advantages and features of the present invention will become readily apparent from the ensuing detailed description, and the novel features will be particularly pointed out in the appended claims.

SUMMARY OP THE INVENTION

In accordance with this invention, a technique is provided for sensing rotation of video information between adjacent video frames, for example, from a previous video frame to a present frame. Rotation vector data is generated to represent the magnitude of the sensed rotation, and this rotation vector data is combined with other motion vector data, such as linear motion vectors which detect linear motion of the two frames.

As another aspect of this invention, zoom-in and zoom-out of video information from a previous frame to a present frame is detected, and zoom vector data representing the magnitude of the sensed zoom is generated and combined with the aforementioned motion vector data.

In the preferred embodiment, both rotation and zoom vector data are generated. This is achieved by segmenting a present frame of video data into plural blocks, establishing a search block which is displaced over a constrained portion of stored video data (which represents a preceding frame) in a rectilinear, rotational and zoom-in/zoom-out directions to search for a block of stored video data that most resembles a selected block segmented from the present frame. Motion vectors x, y, r and z corresponding to the rectilinear, rotational and zoom-in/zoom-out position of the search block that most resembles the selected block are produced. The rotational vector r thus represents the rotation of the selected block relative to its corresponding block in the preceding frame; and the zoom vector z represents the zoom-in or zoom-out of the selected block relative to its corresponding block in the preceding frame.

When the present invention is used in a video compression system, the four-dimensional motion vectors x, y, r and z are added to differential pulse code modulated (DPCM) data (or residual data) which represents the preceding frame (more accurately, the DPCM data represents the residual frame). The video compression system also includes an intraframe encoder which comprises an intraframe spatial redundancy processor, such as an orthogonal transform processor, for example, a DCT processor, for establishing the compressed data to represent an initial video frame.

As an aspect of the present invention, the displacement of a search block for the purpose of producing the motion vectors x, y, r and z is produced by establishing coordinates $x_m$, $y_n$, $r_\Theta$ and $z_p$, wherein m and n are variable integers, $\Theta$ is a variable angle and p is a variable zoom factor. When preset values of m, n, $\Theta$ and p are used, the positioning of a pixel in the search block may not coincide with a pixel in the stored video frame; and in that event, the value of the pixel in the search block is interpolated from adjacent pixels in the stored frame. Then, the differences between the interpolated pixels in the search block and the corresponding pixels in the selected block are determined in order to find a "match," from which the motion vectors are produced.

BRIEF DESCRIPTION OF THE DRAWINGS

The following detailed description, given by way of example, will best be understood in conjunction with the accompanying drawings in which:

FIGS. 2A–2C are schematic representations of the manner in which the blocks of a preceding frame may be rectilinearly moved to reconstitute the blocks of the present frame;

FIGS. 3A–3C are schematic representations of the manner in which the blocks of a preceding frame may be both rectilinearly and rotationally moved to reconstitute the blocks of the present frame;

FIGS. 5A–5C are schematic representations of the manner in which the blocks of a preceding frame may be moved rectilinearly, rotationally and by a zoom factor to reconstitute the blocks of a present frame;

FIGS. 6–15 are schematic representations of the manner in which a search block is established from the pixels included in a preceding frame and is displaced rectilinearly, rotationally and by a zoom factor to provide a match with a given block of the present frame;

FIGS. 19A–19B comprise a flow chart representing the manner in which four-dimensional motion vectors are produced in accordance with the present invention.

DETAILED DESCRIPTION OF A PREFERRED EMBODIMENT

Figure 1:
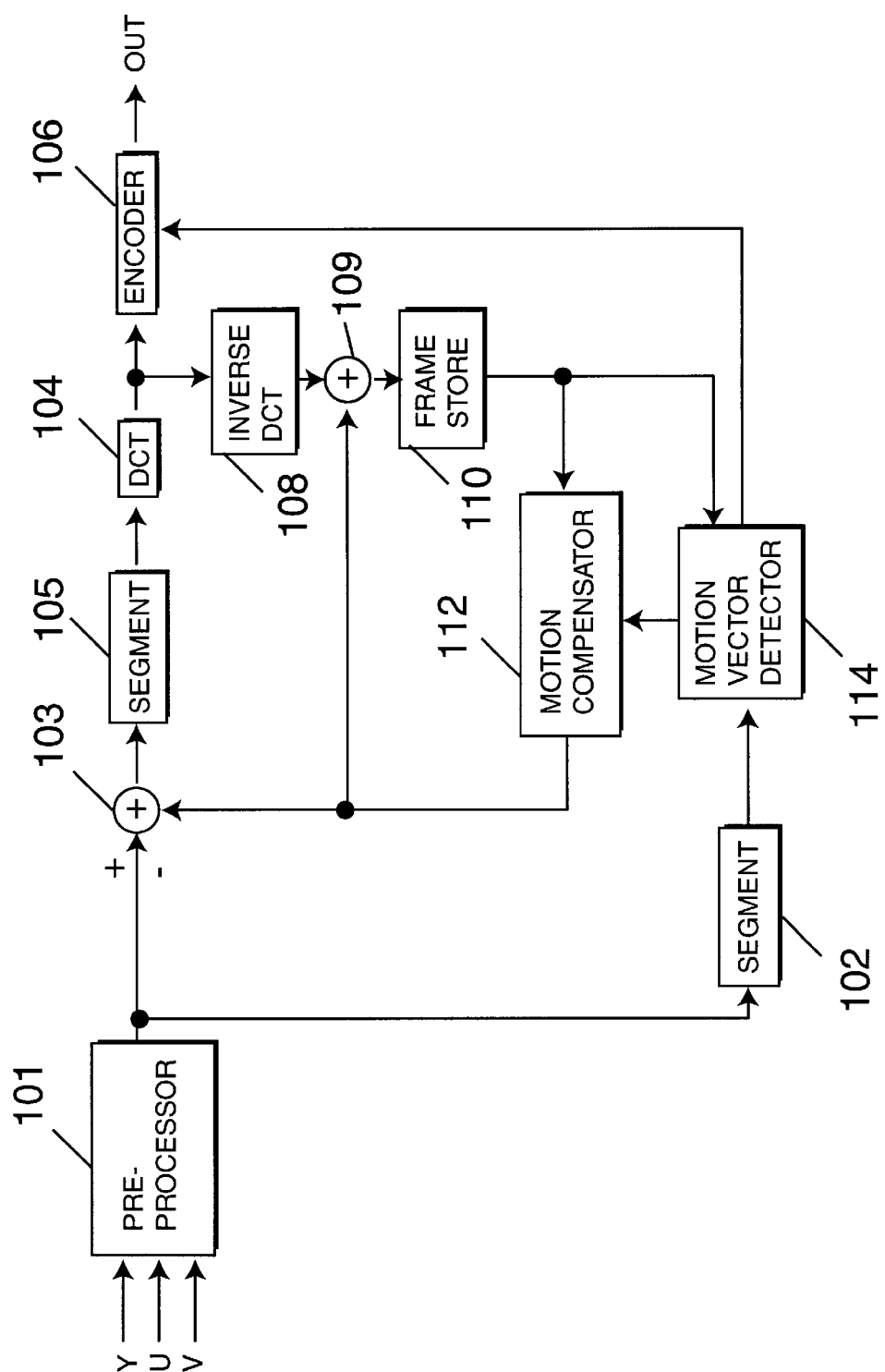
FIG. 1 is a block diagram of a video compression system which incorporates the present invention.

Turning now to FIG. 1, there is illustrated a block diagram of one embodiment of a video compression system which incorporates intraframe data compression and interframe data compression, the latter including means for generating motion vectors which represent rectilinear (or x, y), rotational (or r) and zoom (or z) motion of picture information from one frame to the next. The present invention is directed to detecting rotational and zoom motion and generating motion vectors representative thereof. As will be appreciated from the following discussion, the present invention thus provides four-dimensional motion vector information to characterize frame-to-frame motion of picture information in the x, y, r and z directions.

The block diagram shown in FIG. 1 is adapted to receive and process digitized color video signals which are supplied thereto as digital luminance and digital color components Y, U and V, derived from analog color components R, G, B in a manner known to those of ordinary skill in the art. These digitized video components Y, U, V are preliminarily processed in a preprocessor 101 for initial data reduction, as is also known, and then combined. As seen in FIG. 1, this preprocessor supplies digitized video information to the data compression apparatus, which video information typically consists of picture elements, or pixels, included in those lines of a frame interval which contain useful, viewable picture information.

The data compression apparatus which incorporates the present invention is comprised of segmenting modules 102 and 105, an orthogonal transform circuit 104, a frame store 110, a motion compensator 112 and a motion vector detector 114. Segmenting module 102 is coupled to preprocessor 101 and is adapted to receive the digitized video pixels included in a frame interval and to segment, or divide, those pixels into a number of blocks, each block being formed as an n×n array of pixels. In one embodiment, n=8, but other values of n may be used, as desired. Also, each block formed by segmenting circuit 102 may be comprised of an n×m array, wherein n≠m. The preprocessor also is coupled to orthogonal transform circuit 104 by way of a difference circuit 103 and segmenting module 105 which segments the pixels into blocks formed of an 8×8 array of pixels, as is known. Segmenting module 102 is coupled to motion vector detector 114.

Orthogonal transform circuit 104 is adapted to carry out an orthogonal transform operation on each block of pixels supplied thereto from segmenting circuit 105 and thereby reduce the quantity of data needed to represent the video information included in that block, orthogonal transform circuits are well known to those of ordinary skill in the art and in the preferred embodiment, circuit 104 comprises a discrete cosine transform (DCT) circuit. The operation of DCT circuit 104 forms no part of the present invention per se; and the advantages and operation of this circuit are well documented and known to those of ordinary skill in the art. The DCT coefficients produced by the DCT circuit are supplied to an encoder 106 and are added to a motion compensated frame derived from motion compensator 112 (as will be described) for storage in frame store 110 by way of an inverse DCT circuit 108. Encoder 106 is adapted to encode the DCT coefficients in a conventional data compression code, such as a variable length code, a run length code, or the like. One example of such a run length code implemented by encoder 106 is the well-known Huffman code. The resultant data-compressed encoded data produced by encoder 106 is supplied as an output signal for recording, transmission or further processing.

Although not shown, a quantizing circuit may be coupled to the output of DCT circuit 104 for further data compression; and this introduces noise such that if the original video data is recovered therefrom, the recovered video data would differ from the video data subjected to DCT transformation. Inverse DCT circuit 108 is adapted to operate in a complementary manner to DCT circuit 104 and serves to recover the original pixel data that had been data compressed by the DCT circuit, but with this error. The recovered pixel data is referred to as residual frame data and is summed in an adder 109 with motion compensated frame data produced by motion compensator 112, to be described. The summed output represents the frame of pixel data supplied by preprocessor 101 and is stored in frame store 110 whose capacity is at least sufficient to store a complete frame of video information. It will be appreciated, then, that the pixels stored in frame store 110 are the pixels which comprised the preceding frame interval that had been supplied by preprocessor 101 to the illustrated video compression apparatus. Thus, when a present frame of video information is supplied to segmenting module 102, the preceding frame of video information is stored in frame store 110. The output of the frame store is coupled to motion compensator 112 and to motion detector 114.

The motion detector includes the present invention and is adapted to detect motion in the picture information of the present frame relative to the picture information of the preceding frame. As will be described in greater detail below, motion vector detector 114 functions to detect linear (also referred to as rectilinear) motion in the x and y directions, rotational motion and zoom-in/zoom-out motion. In particular, a given block in the present frame, as supplied to the motion vector detector by segmenting circuit 102' is compared to that same block in the preceding frame, as supplied by frame store 110, to sense whether the block in the present frame has moved from its position in the preceding frame rectilinearly, rotationally and/or by a zoom factor. That is, the motion vector detector functions to detect four-dimensional motion in the x, y, r and z directions. Motion vector data representing the magnitude and direction of such four-dimensional motion is coupled to encoder 106 whereat it is encoded, multiplexed with and transmitted (or recorded) with the encoded DCT coefficients. It will be appreciated by those of ordinary skill in the art that the combination of such motion vector data and DCT coefficient data (or residual frame data) provides sufficient information from which the original video information in a frame interval can be reconstructed and displayed as a high quality video picture.

Motion vector detector 114 also is coupled to motion compensator 112 which functions to adjust the blocks in a preceding frame by the motion which such blocks underwent to result in the present frame, thus predicting the positioning of such blocks in the present frame. The motion compensator thus may be thought of as producing a predicted frame of video information; and this predicted frame is coupled to difference circuit 103 for comparison with the actual, present frame supplied thereto from multiplexer 101 by way of segmenting circuit 102. The output of the difference circuit thus represents the actual differences between the predicted frame and the actual frame, and such differences are subjected to DCT transformation and then are encoded for transmission or recording. These differences (which constitute the residual frame) plus the motion-compensated frame also are used to update the video information stored in frame store 110, thus enabling the frame store to store a reasonably accurate representation of the frame which had just been supplied to the video compression apparatus. It will be appreciated that, if there is little or no motion from one frame to the next, the amount of data needed to update frame store 110 is minimal and, moreover, motion vector detector 114 detects little or no motion.

As is conventional, since the first frame of a new video scene generally bears little resemblance to the video information stored in frame store 110, it is typical to encode this first frame without regard to the preceding frame and to store this first frame in frame store 110 as a base to which succeeding frames are compared. That is, this first frame is encoded in what generally is referred to as intraframe encoding and subsequent frames are compared thereto such that only the differences therebetween are encoded in what has been referred to as interframe coding.

Although the operation of the video compression apparatus shown in FIG. 1 should be readily apparent from the foregoing discussion it will, nevertheless, be briefly described. Let it be assumed that the first frame of a new video scene is supplied from preprocessor 101 to segmenting module 102. It will be appreciated that this first scene can be detected readily by, for example, sensing the magnitude of the motion vectors produced by motion vector detector 114. This present frame of video information also is segmented by segmenting module 105 and is subjected to discrete cosine transformation by DCT circuit 104, encoded in data compression format by encoder 106 and added to the motion compensated frame previously stored in frame store 110 (for this first scene it is assumed that there is no stored, previous frame) and then stored in the frame store.

When the next frame of video information is received, rectilinear, rotational and zoom motion in this frame relative to the preceding frame stored in frame store 110 is detected by motion vector detector 114. Motion vector data produced by the motion vector detector is supplied to encoder 106 together with DCT coefficients representing the residual frame, as is produced by DCT circuit 104. The residual frame together with the motion vectors are encoded and transmitted or recorded, as the case may be.

The motion vectors produced by the motion vector detector are supplied to motion compensator 112 which uses these motion vectors to modify the preceding frame of video information that had been stored in frame store 110. The motion-compensated preceding frame, as produced by motion compensator 112, thus corresponds to a predicted version of the present frame that had been supplied to segmenting module 102. Difference circuit 103 senses the differences between the actual present frame and the predicted frame; and it is these differences, or residual frame, which are subjected to DCT transformation by DCT circuit 104. The DCT coefficients produced by the DCT circuit are encoded by encoder 106 and, with the encoded motion vector data, result in data compression of the video information supplied to the video compression apparatus. The DCT coefficients also are subjected to an inverse operation by inverse DCT circuit 108, thereby recovering the residual frame pixels which were included in the frame that had just been subjected to video compression. These recovered pixels are added to the motion compensated, or predicted frame in summing circuit 109, and are stored in frame store 110 as the preceding frame. The foregoing operation then is repeated on the next-received frame interval of video information.

In the preferred embodiment, motion vector detector 114 may comprise a digital signal processor, a microprocessor or a hard-wired circuit capable of carrying out the functions described in greater detail below and represented by the flow chart shown in FIGS. 19A–19B. However, for a more complete understanding and appreciation of the motion vector detector, the following discussion is presented to describe the manner in which the video information included in the blocks of a preceding frame undergo movement from that frame to the next. Referring first to FIGS. 2A–2C, FIG. 2A schematically illustrates blocks 1, 2, . . . 16 of a previous frame 122 and FIG. 2B illustrates the relative movement, or changed position of those blocks, resulting in the present frame 124. For the purpose of simplification, it is assumed that those blocks of previous frame 122 undergo only rectilinear motion when being reconstituted as present frame 124. For example, block 1 undergoes movement in the −x direction, as does block 2. Block 3 also undergoes movement in the −x direction as well as movement in the +y direction. Block 4 is assumed to undergo movement in the −y direction and block 5 is assumed to remain stationary. The x and y displacements, or rectilinear motion, of the remaining blocks are evident by comparing FIGS. 2A and 2B.

The movement of a block from previous frame 122 to present frame 124, such as the movement of block 1, is detected in motion vector detector 114 by searching the stored pixels of previous frame 122 for a match with the pixels that constitute block 1 in present frame 124. Likewise, the movement of block 2 from frame 122 to frame 124 is detected by searching for a match between those pixels which constitute block 2 in the present frame with the pixels of the corresponding block 2 in the previous frame. Such searching is implemented by establishing a search block to function as a template, and then displacing that block in, for example, the x and y directions until the search block overlies a block in the previous frame which is substantially the same as the block in the present frame. Preferably, this match is determined by sensing when the pixels that are included in the search block as that search block is positioned at different rectilinear locations are substantially the same as the pixels which are included in the block under consideration in the present frame. For example, a pixel-by-pixel comparison is made for each such position of the search block, and differences between each pixel included in the search block and the corresponding pixels in the block of the present frame are summed to produce a block difference value. When the search block is moved to a new position, another block difference value is produced. These block difference values are stored as the search block is displaced over a constrained search area; and the minimum of the stored block difference values is selected to represent the linear motion vector of that block.

FIG. 2C schematically illustrates a search block 126 which is displaced in the x and y directions over a constrained search area 130 while seeking a match between a particular block in the present frame and corresponding block 128 in the previous frame. In one embodiment, search block 126 may be the particular block in the present frame which then is displaced linearly in the x and y directions until it coincides with block 128 in the previous frame. The x displacement and y displacement of search block 126 which brings that block into coincidence with block 128 are used as the x and y motion vectors. That is, x and y vector data are produced by motion vector detector 114 to represent the magnitude of the linear movement of block 128 from the previous frame to the present frame.

FIGS. 2A and 2B schematically illustrate the manner in which linear motion of a block of pixels from one frame to the next is detected. However, if a block in the previous frame, such as block 128, undergoes rotational movement from the previous frame to the present frame, the detection of linear motion may not provide an accurate representation of such rotational motion. FIGS. 3A and 3B represent the manner in which one or more of blocks 1–16 in previous frame 142 undergo rotational movement (as well as rectilinear movement) so as to result in the blocks which constitute present frame 144. That is, if respective ones of blocks 1, 2, . . . 16 of previous frame 142 are rotated, the individual rotations of such blocks will appear as shown in FIG. 3B so as to constitute present frame 144. It is a feature of the present invention to detect such rotational motion and to generate rotation vector data representing the rotations of blocks 1, 2, 3, . . . 16 having the magnitude and direction illustrated in FIG. 3B.

FIG. 3C schematically illustrates the manner in which a search block 146 is displaced both linearly, in the x and y directions, and angularly, in the direction represented by vector r, over a constrained search area 150 in order to detect a match between a particular block in the present frame (from which the search block is derived) and the corresponding block 148 in the previous frame. For example, the search block, which may be thought of as a template corresponding to a given block in the present frame, is displaced by an incremental amount x and y to a new coordinate location within the constrained search area 150, and then the search block is rotated in the positive and negative directions (i.e. clockwise and counterclockwise) searching for a match between the search block and block 148 of the previous frame. It will be appreciated that the search block is displaced both rectilinearly and rotationally in a systematic manner while searching for block 148. Let it be assumed that any given position of search block 146 may be defined by the coordinates $x_m$, $y_n$ and $r_\Theta$, where m and n are variable integers (both positive and negative) and $\Theta$ is a variable angle. A unique position of the search block is established by the individual values of m, n and $\Theta$. For each value of m, n and $\Theta$, the pixels of the stored previous frame that are encompassed by the search block are compared, on a pixel-by-pixel basis, to the corresponding pixels of a given block in the present frame. The difference between the compared pixels is summed to produce a block difference value; and the block difference values that are obtained for each value of m, n and $\Theta$ are stored. After the search block 146 has been linearly and rotationally displaced over the constrained search area 150, the stored block difference value having the smallest value is selected and the values of m, n and $\Theta$ which produced that block difference value are used to generate the linear and rotational vector data. It is appreciated that the smallest block difference value represents a match between the given block in the present frame and block 148 in the previous frame. The values of m, n and $\Theta$ thus represent the amount of linear and rotational movement of block 148 relative to that block in the present frame.

While the technique of detecting linear and rotational motion provides a marked improvement over the detection of only linear motion, it has been found that the video information which constitutes a picture sometimes is produced by zooming in or zooming out on a subject. It is desirable to sense a zoom vector, if present, which represents a fourth dimension of motion. FIGS. 4A–4D illustrate the effect of a zoom operation from one block to the next.

Figure 4A:
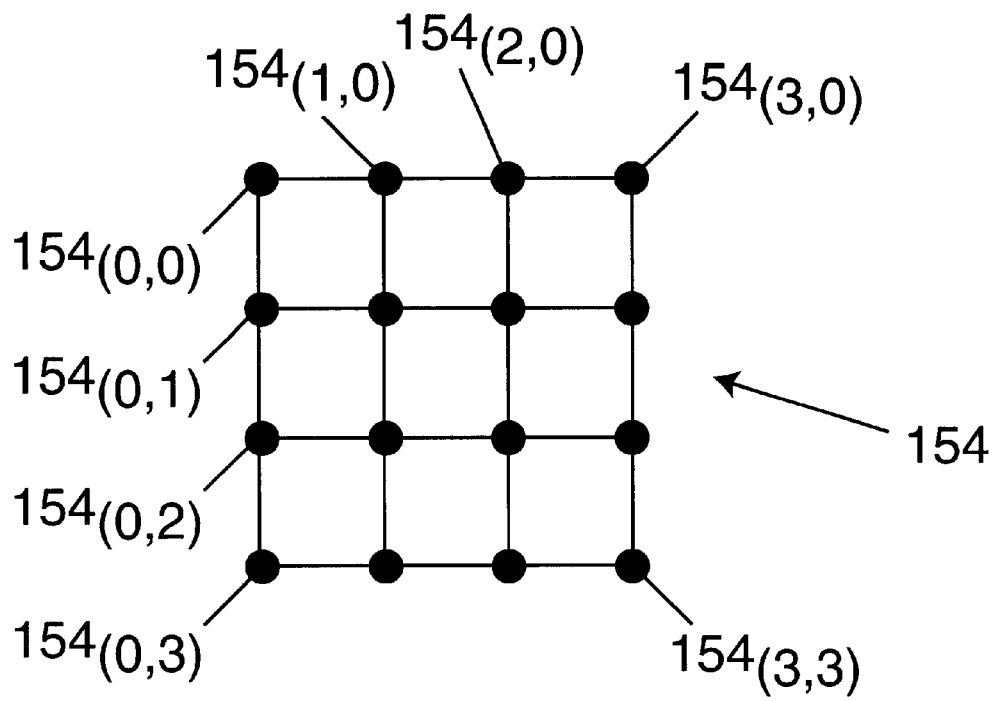
FIGS. 4A–4D are schematic representations of the manner in which a block in the preceding frame may be changed by a zoom factor into a block of the present frame.
Figure 4B:
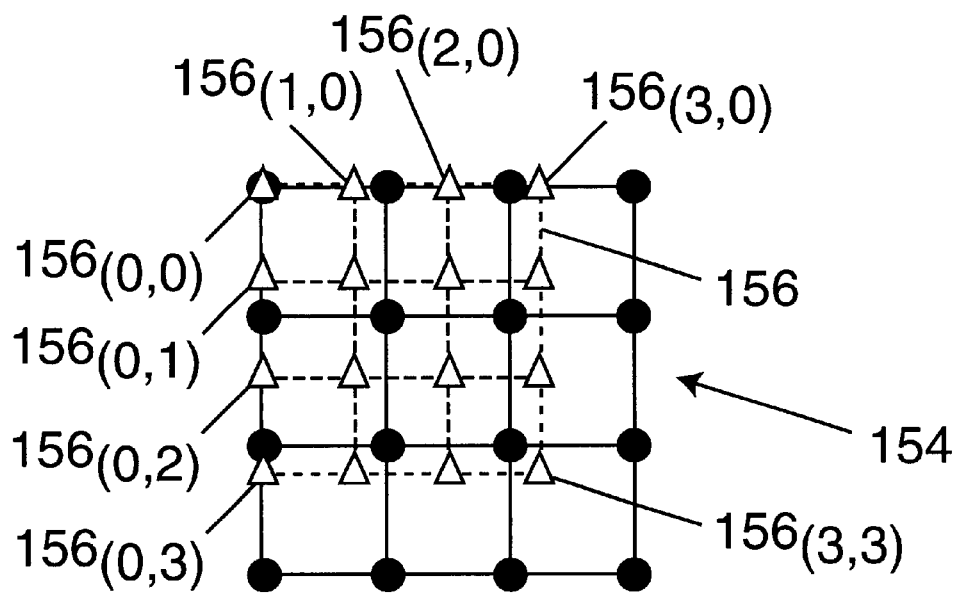

Let it be assumed that a present block 154 is comprised of a 4×4 array of pixels, each of which may be represented as a pixel $154_{(m,n)}$, where m represents an x coordinate and n represents a y coordinate. For simplicity, let it be further assumed that a zoom-in operation is carried out from one frame to the next, such that block 154 in the present frame now may be illustrated as block 156 in the previous frame. FIG. 4B schematically illustrates a superimposition of previous block 156 over present block 154, with the 4×4 pixel array of block 156 being represented by pixels $156_{(m,n)}$. It will be appreciated, therefore, that when the previous frame of video information is searched for a match with a given block of the present frame, the search block that is used as a template must be compensated by a zoom factor Z in order for a proper comparison between previous block 156 of reduced size and present block 154. That is, when searching the previous frame of video information, a block in the previous frame must be "shrunk."

Figure 4C:
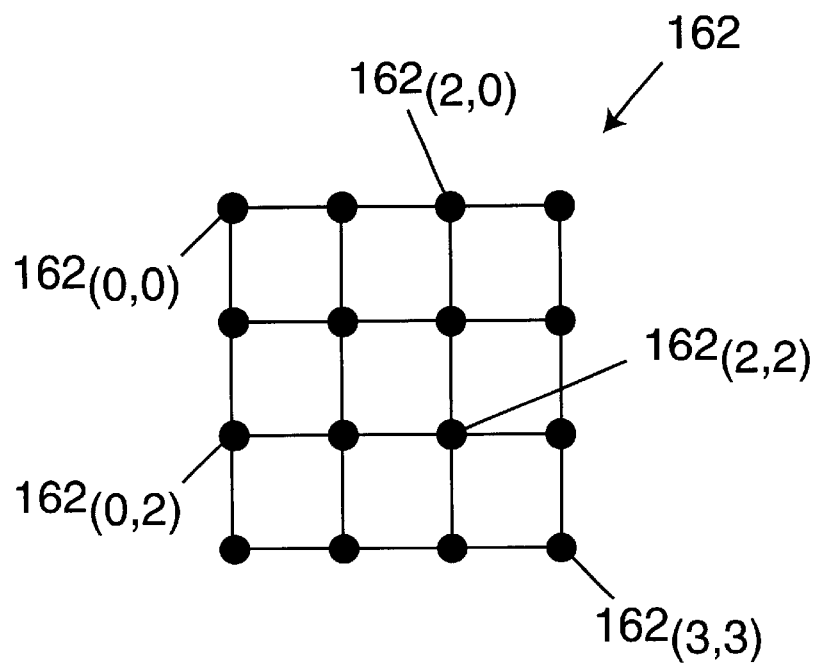
Figure 4D:
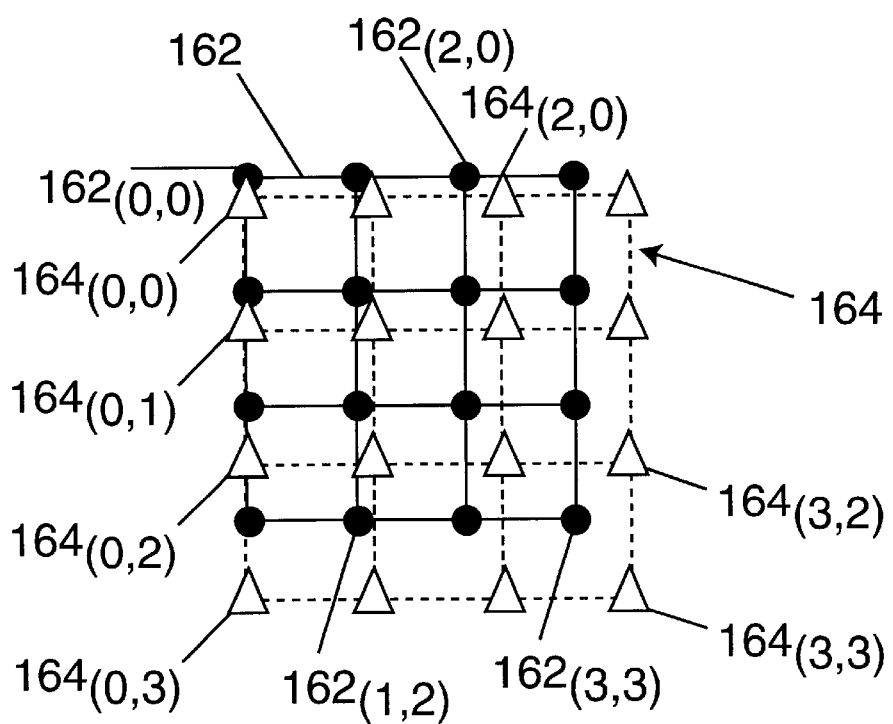

FIGS. 4C and 4D represent the effect on the size of a block in the present frame, such as a present block 162, caused by a zoom-out operation. As before, the present block is assumed, for simplicity, to be comprised of a 4×4 array of pixels $162_{(m,n)}$, as shown in FIG. 4C, and the superimposition thereon of the previous block 164 resulting from the zoom-out operation is illustrated in FIG. 4D. In FIG. 4B, the zoom factor which resulted in present block 156 of increased size may be thought of as a fraction that is greater than unity; and the zoom factor which results in present block 162 of reduced size, as shown in FIG. 4D, may be thought of as a fraction that is less than unity.

In accordance with this feature of the present invention, the zoom factor is used to "shrink" a previous block 156 when the video information of a previous frame is searched for a match when the zoom factor is greater than unity; and the zoom factor is used to "enlarge" previous block 164 when the previous frame of video information is searched for a match when a zoom factor less than unity is used. Since it often is not known whether a zoom factor is present and, if so, whether that factor is greater than or less than unity, it is a preferred embodiment of the present invention to establish a search block with a variable zoom factor $z_p$, where p is variable, and varying p from a value less than unity to a value greater than unity at each position $x_m$, $y_n$ and $r_\Theta$ of the search block as that search block is displaced linearly and rotationally over the constrained search area.

The combination of rectilinear, rotational and zoom motion of the blocks in a previous frame so as to result in substantially the same blocks in the present frame is schematically represented by FIGS. 5A and 5B. It is assumed that FIG. 5A illustrates a previous frame 170 formed of blocks 1, 2, . . . 16, and these blocks undergo respective linear motion in the x and y directions, as well as rotational motion and a zooming motion. As a result of such motion vectors, the blocks which constituted previous frame 170 are re-formed as present frame 172 shown in FIG. 5B. It should be appreciated, however, that FIG. 5B is intended for explanatory purposes only. For example, FIG. 5B illustrates a zooming-out for block 1 and a zooming-in for block 4. It will be recognized that the use of two different types of zooming factors from one frame to the next may not be common if a given scene is present in a single frame. Of course, the use of special effects, editing, superposition and movement of a subject toward or away from the camera might result in a mixture of two different types of zooming factors, as shown in FIG. 5B, but for the purpose of understanding the present invention, this can be ignored.

The manner in which the video information of a previous frame is searched for a block, such as block 176, which matches a given block in the present frame is schematically illustrated in FIG. 5C. Here, a search block 174, which is used as a template, is displaced in the x, y and r directions throughout a constrained search area 178, and for each incremental positioning of search block 174, the size of that search block is changed by the zoom factor z. That is, the search block is displaced to different coordinates $x_m$, $y_n$, $r_\Theta$ and $z_p$ by varying integers m and n, varying angle $\Theta$ and varying the zoom factor p. With each change of each of m, n, $\Theta$ and p, a pixel-by-pixel comparison between the video information defined by the search block and the given block of the present frame is made and a block difference value is produced. As discussed above, all of the block difference values resulting from the displacement of search block 174 are stored, and the minimum block difference value is selected. The values of m, n, $\Theta$ and p which produce that block difference value are used to generate linear, rotational and zoom vector data. Such four-dimensional data is an accurate description and measurement of the motion of each block from a previous frame to the present frame. It is this four-dimensional vector data that is encoded by encoder 106, combined with the encoded DCT coefficients from DCT circuit 104 and transmitted or recorded as compressed video data.

The manner in which a search block is established and displaced rectilinearly, rotationally and by a zoom factor in order to search for a match between a given block of the present frame and the corresponding block in the previous frame and thus produce the four-dimensional motion vectors are illustrated in FIGS. 6–15, which now will be briefly described. As a feature of the present invention, a block of pixels in the present frame is compared to the stored pixels of a previous frame to identify a "match" by establishing a search block which is incrementally displaced in four dimensions x, y, r and z, with the search block serving as a template for defining the pixels of a previous frame to which the block of the present frame is compared. While various techniques may be used for displacing the search block, in the preferred embodiment, the zoom factor z is changed over its preset range from, for example, a zoom factor −5 to a zoom factor +5, and then the rotational coordinate r is incremented, whereafter the zoom factor z once again is incremented over its range from −5 to +5. The foregoing is reiterated for a change in the r coordinate over its preset range from, for example, −π/6 radians to +π/6 radians. Then, the x coordinate is incremented and the foregoing operation is repeated once again. All the while the pixels which are encompassed by the search block are compared to the pixels of the block in the present frame. This incrementing of the x, r and z coordinates is repeated over the preset range of the x coordinate from −8 to +8; and then the y coordinate is incremented. Here too, for each incremental change of the y coordinate, the z coordinate is changed over its preset range and then the r coordinate is incremented; and after the r coordinate has been changed over its preset range, the x coordinate is incremented; and after the x coordinate has been changed over its preset range, the y coordinate is incremented; and the y coordinate likewise is incremented over its preset range from −16 to +16, thereby completing the displacement of the search block for a match with the given block of the present frame. Thereafter, a new block in the present frame is selected and the foregoing search operation is reiterated in order to find a match between this new selected block and the pixels of the stored, previous frame. It will be appreciated that the particular values of x, y, r and z which result in the match, that is, the values which result in the least difference between the pixels of the selected block in the present frame and the stored pixels of the previous frame are used to derive the four dimensional motion vectors x, y, r and z.

With the foregoing in mind, FIG. 6A schematically illustrates a block 184 of the previous frame, which is defined by the search block having the coordinates $x_2$, $y_{-2}$ and $z_1$, relative to a block 186 in the present frame. Block 184 of the previous frame is assumed, for the purpose of the schematic illustration in FIG. 6A, to undergo no rotational displacement, that is, r=0. The pixels which are included in previous frame 184 are illustrated as pixels a, b, c, . . . p, and the corresponding pixels in selected block 186 of the present frame are represented as pixels a', b', . . . p'. To determine a match between previous block 184 having the particular coordinates ($x_2$, $y_{-2}$, $r_0$, $z_1$) and selected block 186, the difference, if any, between pixels a and a', b and b', . . . p and p' is determined. In the preferred embodiment, the absolute value of each difference is obtained and the absolute values are summed to produce a block difference value. This block difference value is stored for each particular coordinate location of the search block (that is, for each different coordinate location of previous block 184) and then, after the search block has been displaced throughout its constrained area, as aforedescribed, the smallest of the block difference values (i.e. the minimum block difference value) is selected as a "match" between previous block 184 and present block 186. The values of x, y, r and z which result in this match represent the motion vectors which define the movement of previous block 184 to present block 186. Preferably, and as a practical matter, all of the determined block difference values need not be stored. Rather, a block difference value is stored if it is less than the block difference value which then is in storage. It is appreciated that, at the end of the displacement of the search block throughout its constrained area, the block difference value that is stored is the minimum block difference value.

FIG. 6B is similar to FIG. 6A, except that previous block 184 in FIG. 6B is assumed to undergo rotation. That is, the r coordinate is assumed to be $r=\Theta_1$. For convenience, it is preferred that a corner of previous block 184 remains fixed at a pseudo origin, and block 184 is rotated by $\Theta_1$ about this pseudo origin. Accordingly, in the example shown in FIG. 6B, the search block is assumed to exhibit the coordinates ($x_2$, $y_{-2}$, $r_{\Theta 1}$, $z_1$) to define previous block 184; and pixels a and a', b and b', . . . p and p' of previous block 184 and present block 186, respectively, are compared. The sum of the absolute differences between the compared pixels is stored.

Figures 6E, 6F:
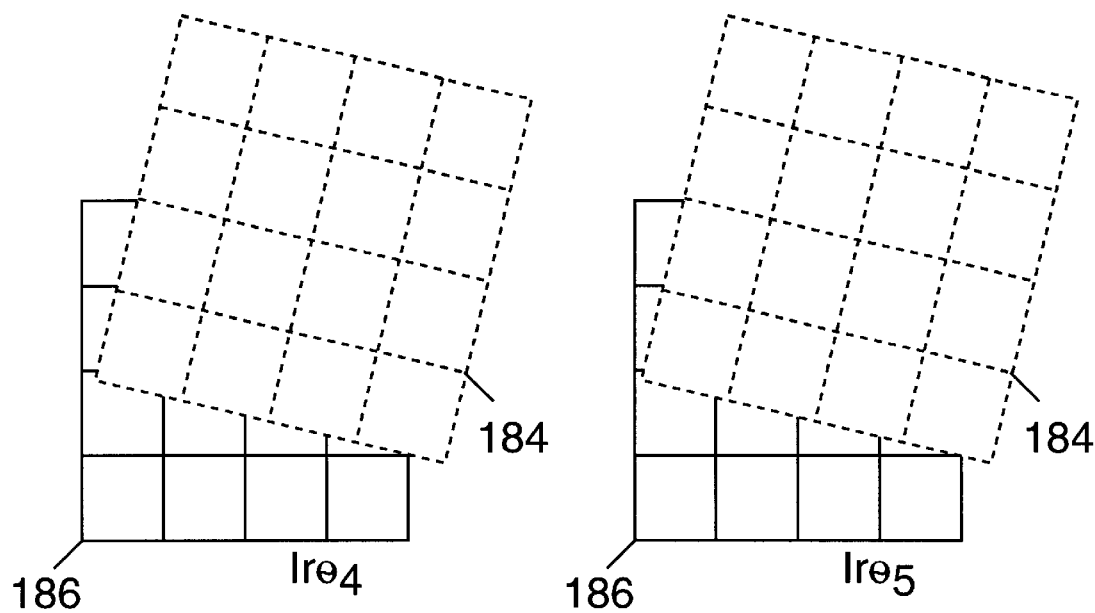
Figures 8E, 8F:
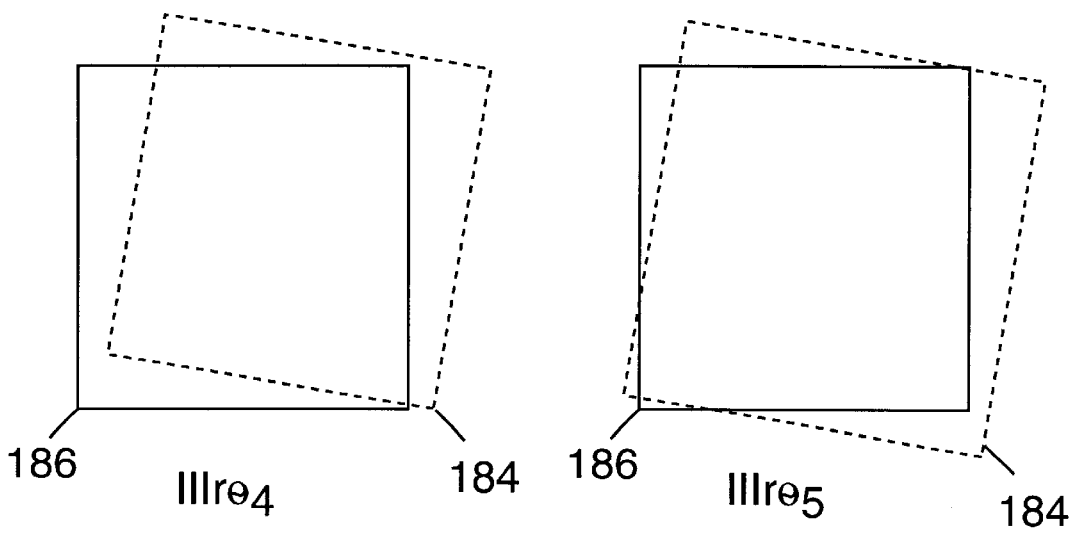

FIG. 6C is similar to FIG. 6B, except that the search block which defines previous block 184 is assumed to be rotated by the amount $r=\Theta_2$. Nevertheless, the remaining coordinates x, y and z remain the same as before. Thus, in FIG. 6C, the search block which defines previous block 184 is located at the coordinates ($x_2$, $y_{-2}$, $r_{\Theta 2}$, $z_1$). FIGS. 6D, 6E and 6F are seen to be similar to FIG. 6B, except that the rotational coordinate r in FIG. 6D is assumed to be $r=\Theta_3$ (in the illustrated example, $\Theta_3$ may be equal to 0); in FIG. 6E, $r=\Theta_4$ and in FIG. 6F, $r=\Theta_5$.

It will be appreciated that, in the example shown in FIGS. 6A–6F, the size of the search block which establishes previous block 184 is smaller than the size of present block 186. That is, the zoom factor is assumed to be a fractional value greater than unity. For convenience, a zoom factor that is less than unity is represented by a negative subscript and a zoom factor that is greater than unity is represented by a positive subscript. Although not shown, the value of the subscript of the zoom factor identifies the number of pixels that the search block is larger or smaller than the present block. For example, the coordinate $z_{-3}$ means that the previous block has zoomed in relative to the present block to a block three pixels larger, in the x and y directions, from the present block (and, of course, the present block appears smaller than the previous block). A zoom factor $z_2$ means that the previous block has zoomed out to a block two pixels smaller in the x and y directions from the present block (and the present block appears larger than the previous block).

In FIGS. 7A–7F, the values of the x and y coordinates are assumed to be the same as the values of those coordinates shown in the example of FIGS. 6A–6F, that is, $x_2$ and $y_{-2}$, but now the zoom factor is assumed to be $z_0$. Thus, the size of previous block 184, as defined by the search block, is assumed to be of the same size as that of present block 186. With these coordinates ($x_2$, $y_{-2}$, $z_0$), the rotational coordinate r is varied as follows: in FIG. 7B, $r=\Theta_1$; in FIG. 7C, $r=\Theta_2$; in FIG. 7D, $r=\Theta_3$; in FIG. 7E, $r=\Theta_4$; and in FIG. 7F, $r=\Theta_5$. For each coordinate ($x_2$, $y_{-2}$, $r_\Theta$, $z_0$) shown in FIGS. 7B–7F, the difference between pixels a and a', b and b', . . . p and p' of previous block 184 and present block 186, respectively, is determined and these differences are summed to produce the aforementioned block difference value.

Figure 9A:
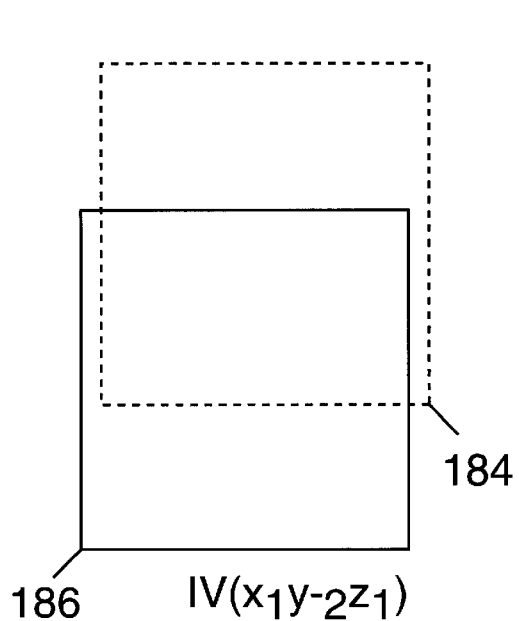
Figure 9B:
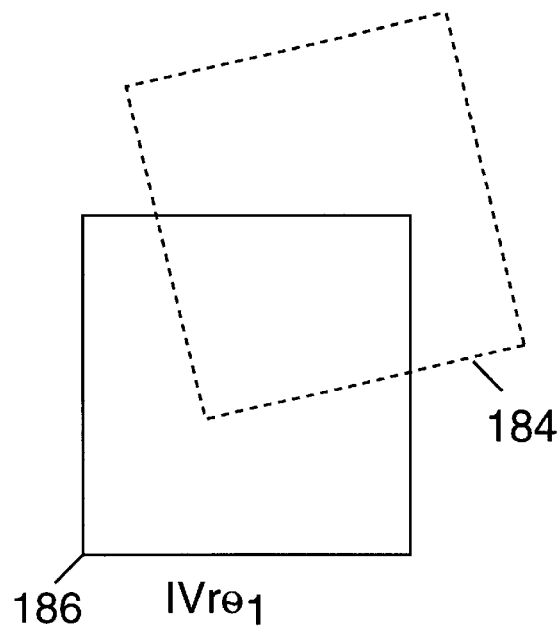
Figure 9C:
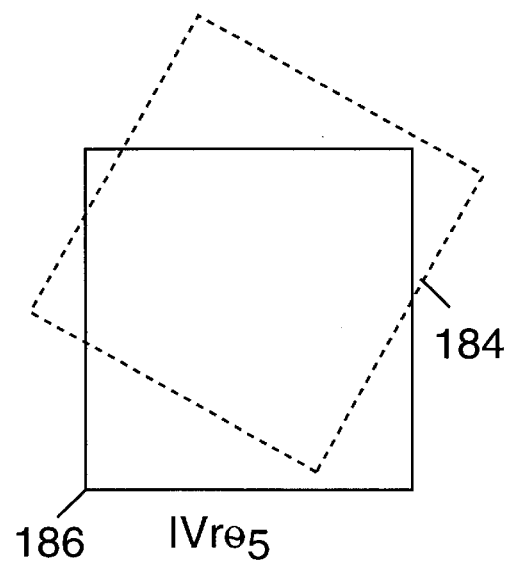

FIGS. 8A–8F schematically illustrate the displacement of the search block which establishes previous block 184 over the rotational range from $\Theta_1$ to $\Theta_5$ for the coordinates $(x_2, y_{-2}, z_{-1})$ It is seen that the size of previous block 184 is larger than that of present block 186, that is, the zoom factor is less than unity. For this zoom factor, a match between present block 186 and the pixels of the stored, previous frame is searched based upon the assumption that the previous frame has zoomed in on the subject (and, of course, the present frame has zoomed out). FIGS. 9A–9C are illustrative of the example wherein the x coordinate has changed from $x_2$ to $x_1$, the y coordinate is assumed to remain at $y_{-2}$, the zoom coordinate is assumed to be $z_1$ and the rotational coordinate varies from $\Theta_1$ (FIG. 9B) through zero (FIG. 9A) to $\Theta_5$ (FIG. 9C). For simplification, other values of $\Theta$ are not illustrated in the example of FIG. 9. Nevertheless, it will be appreciated that, for each coordinate $x_1, y_{-2}, r_\Theta, z_1$, the difference between pixels a and a', b and b', . . . p and p' is obtained, summed and stored as the block difference value.

FIGS. 10A–10C are similar to FIGS. 9A–9C, except that the zoom factor z is assumed herein to be $z_0$. The previous block 184 which is established by the search block is seen to undergo rotational displacement, wherein the r coordinate is changed over the range shown as r=0 (FIG. 10), $r=\Theta_1$ (FIG. 10B) and $r=\Theta_5$ (FIG. 10C). For each incremental displacement of the search block, the pixels a, b, . . . p encompassed thereby are compared to corresponding pixels a', b', . . . p' of present block 186 to produce a block difference value for each such orientation of the search block.

Likewise, FIGS. 11A–11C illustrate different rotational displacements of previous block 184, as defined by the search block, for the coordinates $(x_1, y_{-2}, z_{-1})$. It is appreciated that the zoom factor z here is assumed to be less than unity, which means that the size of the search block is greater than the size of the present block and represents a zoom-out operation.

FIG. 12A illustrates yet another incremental displacement in the x direction, wherein the coordinates of previous block 184, as defined by the search block, are $(x_0, y_{-2}, r_0, z_1)$. FIG. 12B illustrates the incremental rotational displacement of the search block shown in FIG. 12A, wherein search block 184a illustrates an angular rotation $r=\Theta_1$, search block 184b illustrates the angular rotation $r=\Theta_2$ and search block 184c illustrates the angular rotation $r=\Theta_5$. That is, the search block shown in FIG. 12A is subjected to incremental rotations of the type shown in FIG. 12B.

In FIG. 13, the search block is assumed to undergo yet another incremental displacement in the horizontal direction, resulting in an x coordinate of $x_{-1}$. Here too, and simply for the purpose of illustration, the zoom factor z is assumed to be $z_1$ and the y coordinate is assumed to remain at $y_{-2}$. With this search block having the coordinates $(x_{-1}, y_{-2}, z_1)$, FIG. 13 illustrates selected angular rotations of the search block, whereby search block 184a exhibits the rotational coordinate $r=\Theta_1$, search block 184b exhibits the rotational coordinate $r=\Theta_3$ and search block 184c exhibits the rotational coordinate $r=\Theta_5$. As before, the block difference value between each of the illustrated search blocks and present block 186 is obtained and stored.

Figure 14:
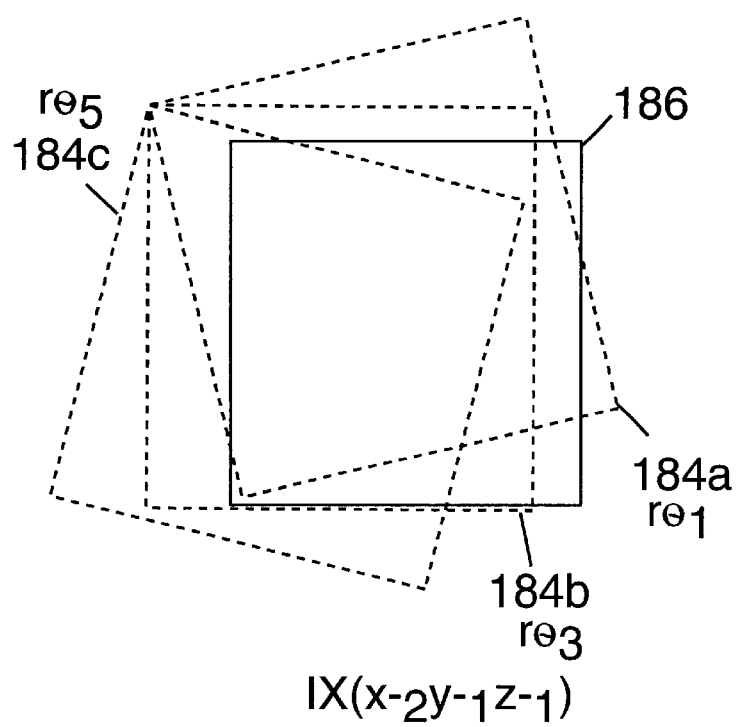

FIG. 14 is similar to FIG. 13, but here illustrates the coordinates of the search block which establishes previous block 184 as $(x_{-2}, y_{-1}, z_{-1})$. Thus, the x and y coordinates of the search block are changed from those of FIG. 13, and for illustrative purposes, the zoom factor z is assumed to be less than unity, as represented here by $z_{-1}$.

Figure 15:
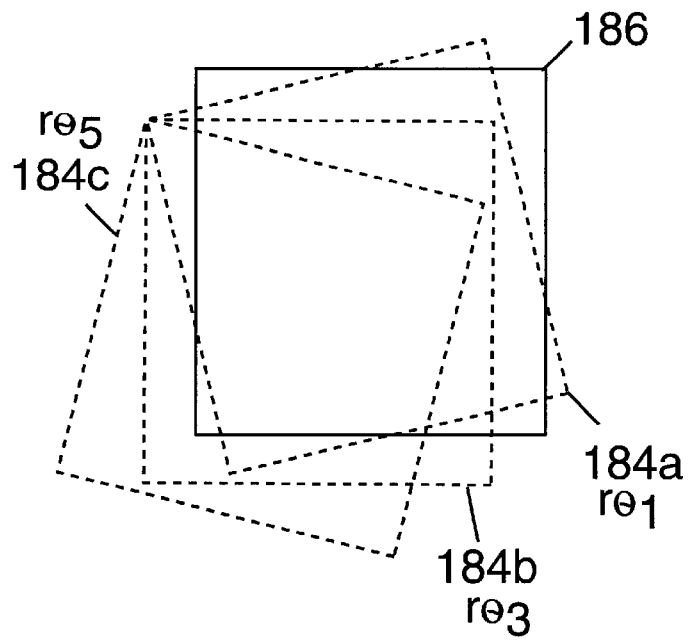

FIG. 15 illustrates yet another example of the coordinates of the search block which define previous block 184 as $(x_{-1}, y_2, z_1)$. It is seen that the x and y coordinates of the search block have been changed, the zoom factor is assumed to be greater than unity, and with the thus-defined search block, the rotational coordinate thereof is varied. As can be seen from FIG. 15, the rotational coordinate of search block 184 is varied over a range, and illustrative positioning thereof is depicted as search block 184a, wherein $r=\Theta_1$; search block 184b, wherein $r=\Theta_3$; and search block 184c, wherein $r=\Theta_5$. As before, the block difference value between each of search blocks 184a, 184b and 184c and present block 186, that is, the difference between the pixels of these search blocks and the pixels of present block 186, is obtained and stored.

After x, y, r and z have been varied over their preset ranges, as discussed above and as schematically illustrated in FIGS. 6–15, the minimum block difference value that has been produced is selected, and the values of the coordinates $x_m, y_n, r_\Theta$ and $z_p$ which result in this minimum block difference value are used to derive the motion vectors x, y, r and z. That is, the particular location and size of the search block, as represented by these coordinates, which results in a match between present block 186 and a previous block 184, are used to determined the rectilinear, rotational and zoom movement of the previous block which results in the present block.

Figure 16:
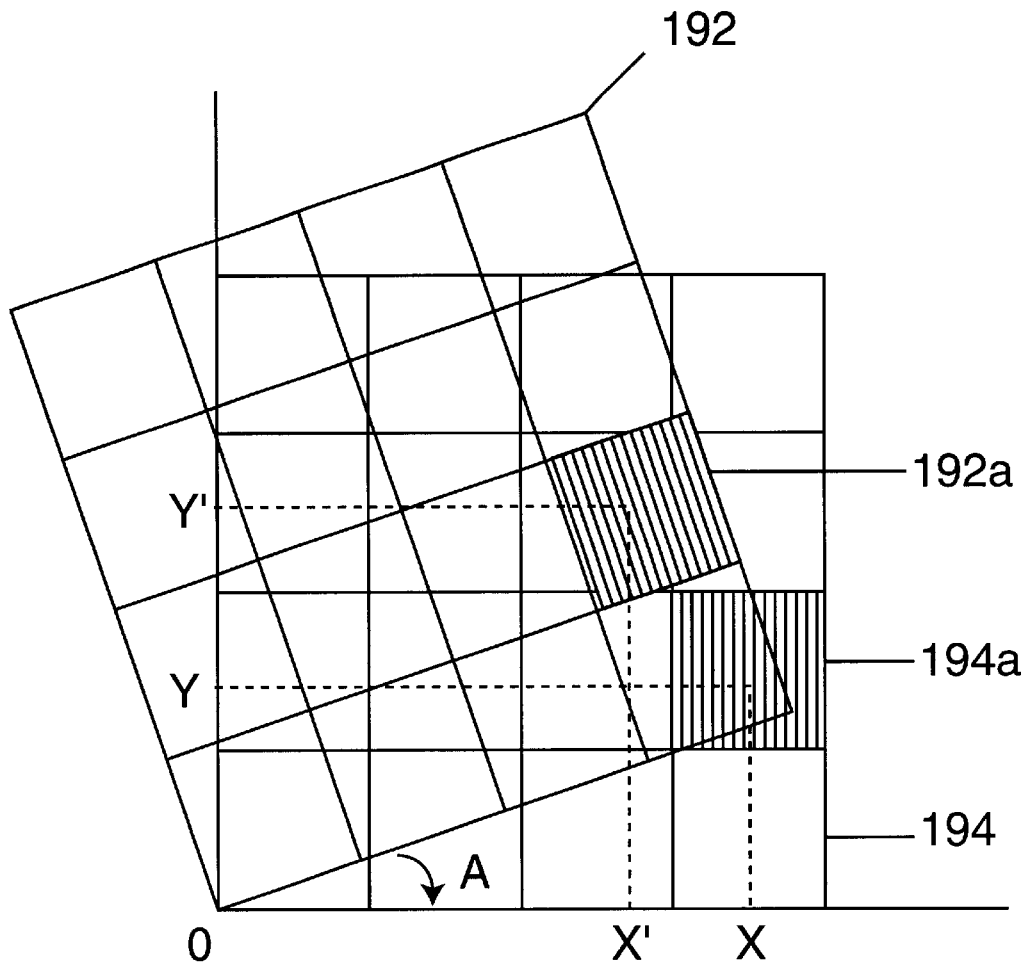
FIG. 16 is a schematic representation of the rotation of a pixel in a block of the present frame relative to that same pixel in the corresponding block of the preceding frame.

The rotation of a block of pixels in the present frame relative to that same block in the previous frame is further illustrated in FIG. 16. Let it be assumed that a pixel 194a in present block 194 is disposed at the coordinate location X, Y relative to an arbitrary origin. The corresponding pixel 192a in the previous block 192 is seen to be disposed at the coordinate location X', Y' and the rotation of previous block 192 which results in present block 194 is represented by the angle A. Now, the coordinate locations X', Y' of pixel 192a in the previous block are related to coordinates X, Y and rotational angle A by the following equations:

$$X' = X \cos A - Y \sin A \quad (1)$$

$$Y' = X \sin A + Y \cos A \quad (2)$$

Thus, when the pixels included in a present block 194 are known, the locations of corresponding pixels in the previous block may be determined from equations (1) and (2) above. Stated otherwise, if a search block is rotated by the angle A relative to the present block, then the pixel at location X', Y' in the rotated search block may be ascertained from the foregoing equations. As will be described below, a pixel in the stored previous frame may not be disposed exactly at the coordinate location X', Y'. In that event, the pixel at this location X', Y' is determined by interpolating its value from pixels which are disposed in the stored, previous frame adjacent to this location.

Figure 17:
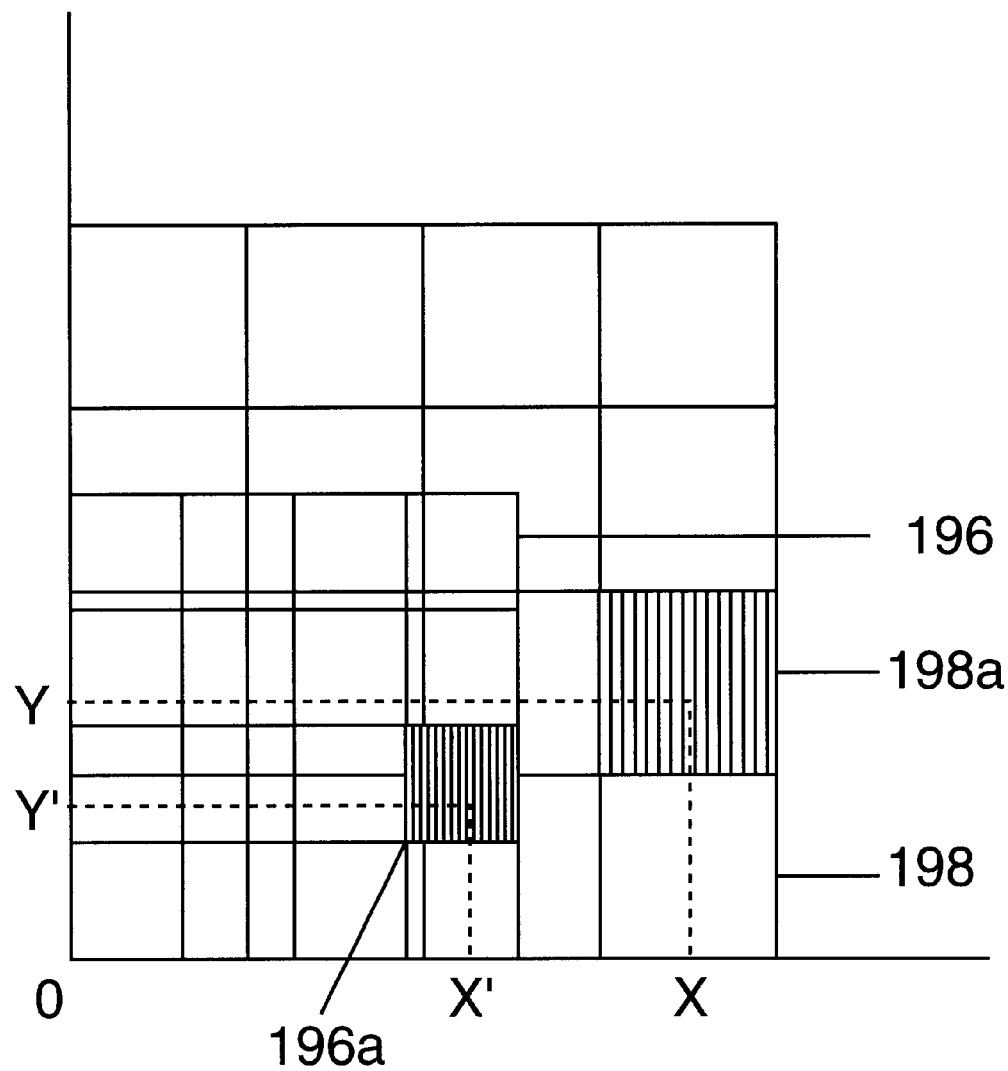
FIG. 17 is a schematic representation of the change of a pixel in a block of the present frame relative to that same pixel in the corresponding block of the preceding frame resulting from a zoom-in operation.

FIG. 17 provides a schematic representation of the manner in which a pixel 198a in a block 198 of the present frame, located at coordinates X, Y is related to its corresponding pixel 196a in a block 196 of the previous frame when the zoom ratio between these frames is represented as Z. For example, it is assumed that present block 198 is produced by a zooming in operation which means that the previous block has zoomed out relative to the present block and results in a decrease in size of the previous block relative to the present block. Let it be assumed that pixels 198a and 196a are the same pixels in the present and previous blocks 198, 196, respectively, and pixel 198a is located at coordinates X, Y while pixel 196a is located at coordinates X', Y'. Assuming a zoom ratio Z, then the coordinates X', Y' may be derived from coordinates X, Y as follows:

$$X' = Z X \quad (3)$$

$$Y' = Z Y \quad (4)$$

Thus, if the zoom ratio Z is assumed, and if the coordinates of a given pixel 198a are known, then the coordinates of the corresponding pixel in the search frame may be readily determined.

For simplicity, it has been assumed that there is no rotational movement from previous block 196 to present block 198. If there is rotational movement, then the coordinates X', Y' of the same pixel in the search block are determined by combining the rotational coordinate determination discussed above in conjunction with FIG. 16 with the zoom coordinate determination discussed in conjunction FIG. 17.

Figure 18:
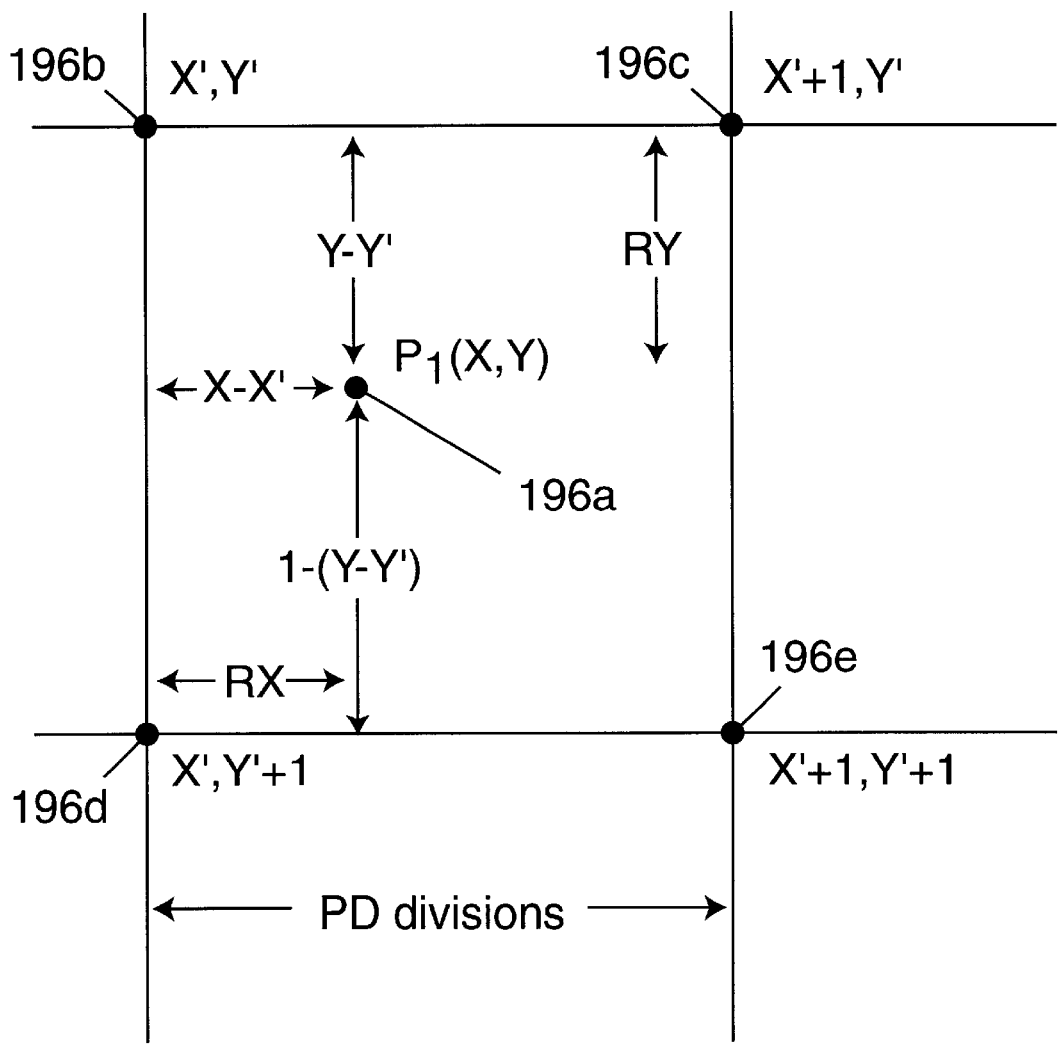
FIG. 18 is a schematic representation of the manner in which a pixel in the search block is interpolated from pixels in a preceding frame.

Consistent with the discussion set out hereinabove with respect to FIGS. 6–15, previous block 196 is defined by a search block. Pixel 196a located at coordinates X', Y' in this search block may not coincide precisely with a pixel in the stored, previous frame. In that event, the value of pixel 196a at coordinates X', Y' is determined by interpolating from those pixels in the previous frame which are adjacent thereto. The manner in which the value of a pixel in a search block is interpolated from adjacent pixels in the stored, previous frame is illustrated in FIG. 18 and now is described.

Let it be assumed that, by reason of the rotation shown in FIG. 16, or the zoom factor shown in FIG. 17, or a rectilinear displacement such as shown in FIG. 2B, or a combination thereof, a particular pixel in a search block is located at a point having the coordinates (X, Y), as represented by pixel 196a, and the value of this pixel may be represented as $P_1(X,Y)$. This pixel, although in the neighborhood of adjacent pixels 196b, 196c, 196d and 196e in the previous frame, nevertheless does not coincide with any of these actual pixels. For convenience, it is assumed that pixel 196b is located at coordinates (X', Y'), pixel 196c is located at coordinates (X'+1, Y'), pixel 196d is located at coordinates (X', Y'+1) and pixel 196e is located at coordinates (X'+1, Y'+1). Let it be further assumed that the distance between pixels 196b and 196c may be formed of PD divisions. For example, PD may be any convenient integer, such as 10. Let it also be assumed that pixels 196b and 196d are separated by these same PD divisions. The location of pixel 196a relative to its adjacent pixels 196b–196e is as shown in FIG. 18. That is, the X coordinate of pixel 196a is spaced from pixel 196b by the amount X–X' and is spaced from pixel 196c by the amount 1–(X–X'). The Y coordinate of pixel 196a is spaced from pixel 196b by the amount Y–Y', and this pixel is spaced from pixel 196d by the amount 1–(Y–Y'). Now, the value of pixel 196a at coordinates (X, Y) may be mathematically determined from the following equation:

$$P_1(X, Y) = [(X', Y') \cdot (PD - RX) \cdot (PD - RY) + \\ (X'+1, Y') \cdot RX \cdot (PD - RY) + \\ (X', Y'+1) \cdot (PD - RX) \cdot RY + \\ (X'+1, Y'+1) \cdot RX \cdot RY]/(PD \cdot PD) \quad (5)$$

where $$RX = (X - X') \cdot PD$$

$$RY = (Y - Y') \cdot PD$$

It is appreciated that equation (5) can be easily implemented by a suitably programmed microprocessor or digital signal processor once the coordinates X, Y and the locations of pixels 196b–196e are known. In a practical embodiment, coordinates X, Y are readily determined, as illustrated in FIGS. 16 and 17, and pixels 196b–196e are, of course, pixels which are included in the stored, previous frame.

The manner in which the four-dimensional motion vectors x, y, r and z are determined by motion vector detector 114 now will be described in conjunction with the flow chart shown in FIGS. 19A–19B. In one embodiment, this flow chart is implemented by a suitably programmed microprocessor; and in the preferred embodiment, a digital signal processor or, alternatively, a hard-wired processor, is used to execute this flow chart.

Figure 19A:
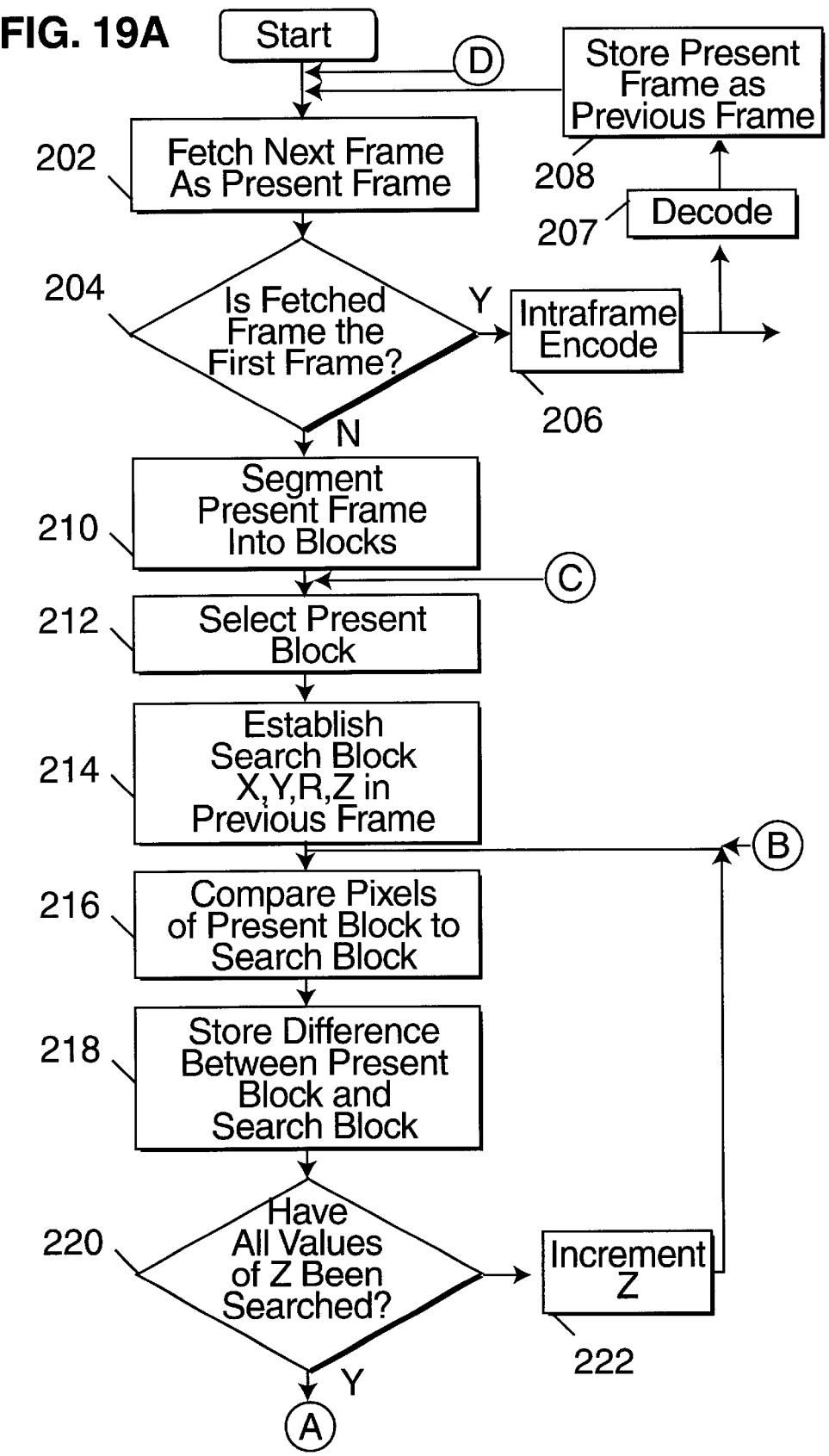

As illustrated in FIG. 19A, the motion vector detecting routine commences with instruction 202 which fetches the next frame of video information supplied from preprocessor 101 and designates this frame as the present frame. Then, inquiry 204 is made to determine if the fetched frame is the first frame, such as the first frame in a scene. If so, instruction 206 is carried out, whereby the video information is compressed by relying upon intraframe encoding, whereby the spatial redundancy within this frame is reduced by direct cosine transformation or by other spatial redundancy reducing techniques known to those of ordinary skill in the art. Thereafter, the compressed, encoded video information is decoded at 207 and then stored as the previous frame at instruction 208. Then, the routine returns to instruction 202 and the next frame of video information supplied by multiplexer 101 is fetched. Assuming that the fetched frame is not the first frame in a scene, inquiry 204 is answered in the negative and the routine advances to instruction 210, whereby the present frame (that is, the frame which had been fetched by instruction 202) is segmented into blocks. In FIG. 1, this segmentation operation is illustratively carried out by segmenting circuit 102.

Thereafter, the routine advances to instruction 212 to select a block in the present frame. This block may be block 186 shown in FIGS. 6–15. Then, instruction 214 is carried out, which establishes a search block having coordinates x, y, r, z, such as one of the search blocks illustrated in FIGS. 6–15. It will be appreciated that these coordinates may be more accurately expressed as $x_m$, $y_n$, $r_\Theta$, $z_p$, where m, n, Θ and p each are individually variable over respective ranges, such as mentioned above.

After the search block is established, each pixel therein is compared to its corresponding pixel in the selected present block, as represented by instruction 216. For example, each pixel may be represented as an 8-bit character corresponding to the brightness of that pixel and the absolute difference between an 8-bit pixel in the present block and an 8-bit pixel in the search block is obtained. The 8-bit pixel in the search block may be interpolated in the manner shown in FIG. 18 if its coordinate location in the search block does not coincide with a pixel in the previous frame. The differences obtained for each of the respective, compared pixels are summed to produce a block difference value and if the block difference value between the present block and the search block is a minimum value, it is stored at 218.

As an alternative, a block difference value may be produced by other conventional error detecting techniques, such as obtaining the sum of the squares of the differences between the pixels of the present and search blocks, or other conventional techniques.

After the block difference value between the present block and the search block has been determined and, if of a minimum value compared to other block difference values, as described above has been stored, the routine advances to inquire, at 220, if all of the values of a selected one of the coordinates x, y, r and z have been searched. In the example described herein, inquiry 220 determines if all of the values of the zoom coordinate have been searched. If not, the routine advances to instruction 222 which increments the zoom coordinate z by one, thus displacing the search block by, for example, reducing the size of the search block. Thereafter, instructions 216 and 218 and inquiry 220 are repeated.

As before, instruction 218 stores the block difference value obtained for the incremented zoom coordinate if that block difference value is a minimum. The routine then cycles through the loop formed of instructions 216, 218, 222 and inquiry 220 until all of the preset values of the zoom coordinate have been searched. That is, as the search block is displaced, each displacement thereof is compared to the present block. After all of the zoom coordinate values have been searched, inquiry 220 is answered in the affirmative and the routine advances to inquiry 224, shown in FIG. 19B. Here, inquiry is made to determine if all of the values of the rotation coordinate have been searched over the preset range established therefor. If this inquiry is answered in the negative, instruction 226 is executed, whereby the value of the rotation coordinate r is incremented. It is appreciated that this incrementing of the rotation coordinate introduces an angular displacement in the search block; and the routine then returns to instruction 216, whereby the pixels of the displaced search block are compared once again to the pixels of the present block. Then, as before, the routine cycles through the loop formed of instructions 216, 218 and 222 and inquiry 220 until the zoom coordinate z has been incremented over its entire range. Then, inquiry 224 is made once again; and is assumed herein to be answered in the negative. Therefore, the rotation coordinate r is incremented, and the foregoing operation is repeated one more time. It is seen that the routine reiterates the incrementing of the zoom coordinate z and the rotation coordinate r until the rotation coordinate has been incremented over its entire range. At that time, when the routine reaches inquiry 224, this inquiry is answered in the affirmative, and the routine then advances to inquire, at 228, if all of the values of the x coordinate have been searched. If not, the x coordinate is incremented, as indicated by instruction 230, and the routine returns once again to instruction 216.

It is appreciated that, with each incremental change of the x coordinate, the routine cycles through the loop which includes instruction 222, and after the z coordinate has been incremented over its entire range, the rotation coordinate r is incremented, as represented by instruction 226, whereupon the search block and present block are compared, on a pixel-by-pixel basis, for each value of the z coordinate. Eventually, the rotation coordinate r is incremented over its entire range, whereupon the x coordinate is incremented one more time. This reiterative operation continues until the x coordinate has been incremented over its entire range. Thereafter, when the routine returns to inquiry 228, this inquiry is answered in the affirmative and inquiry 232 then is made to determine if all of the values of the y coordinate have been searched. If not, instruction 234 is executed to increment the y coordinate by one. The routine then returns to instruction 216, and the foregoing reiterative operation is repeated once again.

From the foregoing discussion, it is seen that a hierarchical order of incrementing the x, y, r and z coordinates is established; and although any one of these coordinates may be selected as having the least hierarchical value and any other coordinate may be selected as having the highest hierarchical value, in the present example it has been assumed that the zoom coordinate z exhibits the lowest hierarchical value and the y coordinate exhibits the highest hierarchical value. The coordinate having a higher hierarchical value is incremented by one only after the coordinate having the next lower hierarchical value is incremented over its entire range. In this manner, the search block established by instruction 214 is linearly, rotationally and zoom-in/zoom-out displaced over a constrained search area while the pixels of a previous block defined by the search block are compared to their corresponding pixels in the present block.

As has been discussed hereinabove in conjunction with FIGS. 16–18, it is likely that a pixel in the search block does not coincide with a stored pixel of the previous frame. In that event, the value of the pixel in the search block is interpolated from those stored pixels in the previous block which are adjacent thereto. The difference between a pixel in the present block and the corresponding pixel in the search block is determined by comparing the pixel in the present block to the interpolated pixel in the search block.

The minimum block difference value for the overall displacement of the search block is stored, as represented by the reiterative execution of instruction 218. After the y coordinate has been incremented over its entire range, as represented by an affirmative answer to inquiry 232, the routine advances to instruction 236 to use the minimum block difference value. As shown by instruction 236, the x, y, r and z coordinates which resulted in that minimum block difference value are obtained. That is, if coordinates $x_m$, $y_n$, $r_\Theta$ and $z_p$ are stored with this minimum block difference value, the values of m, n, $\Theta$ and p are used to generate the motion vectors in the x, y, r and z directions. Stated otherwise, the values of m, n, $\Theta$ and p which define the position of the search block that results in the minimum block difference value are identified; and these values are used to generate the motion vectors.

After generating the motion vectors, the routine advances from instruction 236 to inquiry 238 which determines if the last of the segmented blocks in the present frame has been compared to the stored video information of the previous frame. That is, inquiry is made to determine if the last of the segmented blocks has been searched for a match with a previous block. If not, the routine returns to instruction 212 which establishes a new search block at coordinates x, y, r and z; and then the foregoing reiterative operation is repeated.

Eventually, all of the segmented blocks in the present frame will have been compared to the blocks of the previous frame. At that time, when inquiry 238 is reached, it is answered in the affirmative. Then, instruction 240 is carried out and the motion vectors which are produced by instruction 236 are encoded, as by encoder 106 (FIG. 1) and transmitted or recorded for subsequent use to reconstruct the corresponding video picture.

In addition, the motion vectors are decoded and, as shown in FIG. 1, used to compensate the previous frame that had been stored in frame store 110 pursuant to instruction 208. The motion-compensated frame is summed with the residual frame derived from DCT transformation circuit 104 (FIG. 1) and then stored as the previous frame, as represented by instruction 242. The routine then returns to its beginning, shown in FIG. 19A, to determine the four-dimensional motion vectors for the next frame of video information.

While the present invention has been particularly shown and described with reference to a preferred embodiment, it will be readily appreciated by those of ordinary skill in the art that various changes and modifications may be made without departing from the spirit and scope of the invention. For example, the hierarchical order in which the individual coordinates are incremented need not be limited solely to the example discussed above. Also, any technique which compares the present block to a previous block in order to detect a "match" therebetween may be used. Summing the absolute values of the differences between each pixel in the present block and the corresponding pixels in the previous block is not the only means contemplated to produce a block difference value. As mentioned previously, the sum of the squares of differences may be utilized and still other techniques known to those of ordinary skill in the art may be incorporated into the present invention. Still further, although encoding of the four-dimensional motion vectors has been described and is preferred, the present invention does not rely upon and should not be limited to the use of an encoding step.

Although the search block discussed herein has been used as a template to define a previous block to which the present block is compared, the search block may serve as a template for defining a present block to which a given previous block is compared.

Therefore, it is intended that the appended claims be interpreted as including the embodiment described herein, those modifications and alternatives which have been discussed above and all equivalents thereto.

What is claimed is:

1. Apparatus for use in a video compression system having a motion vector generator for detecting linear motion of video information from one video frame to another and for generating motion vector data representative thereof, and an intraframe spatial redundancy processor for reducing video data representing the video information within a video frame, said apparatus comprising: rotation sensing means for sensing rotation of video information from a previous frame to a present frame; rotation vector generating means for generating rotation vector data representing a magnitude of the rotation sensed by said rotation sensing means; and means for combining said rotation vector data with said motion vector data.

2. The apparatus of claim 1 wherein said rotation sensing means comprises block segmenting means for dividing the present video frame into a plurality of blocks, each block being formed of a two-dimensional array of pixels; and block rotation sensing means for sensing the rotation of respective blocks of said present video frame relative to those blocks of said previous frame.

3. The apparatus of claim 2 wherein said rotation vector generating means generates block rotation data representing the relative rotation of each said respective block in said present video frame.

4. The apparatus of claim 3 wherein said block rotation sensing means comprises frame store means for storing the blocks of said previous video frame; block search means for searching the stored blocks within a constrained search area for a block that is substantially the same as a particular block in said present video frame; and determining means for determining the relative rotation of said particular block relative to the stored block that is substantially the same thereas.

5. The apparatus of claim 4 wherein said block search means comprises means for rotating each pixel in the two-dimensional array of pixels in a stored block by a first angular amount to angularly interpolate each said pixel; means for determining a difference between said each angularly interpolated pixel in the stored block rotated by said first angular amount and substantially the same pixel in said particular block; reiterate means for reiterating the operation of said means to angularly interpolate and said difference means successively for different angular amounts; minimum difference sensing means for sensing the minimum difference determined by said difference means during the reiterative operation thereof; and identifying means for identifying the angular amount which resulted in an angular interpolation that produced said minimum difference.

6. The apparatus of claim 5 wherein said difference means comprises means for determining an absolute difference between each said same pixel in said particular block and each said angularly interpolated pixel in said stored block for each rotation of said stored block.

7. The apparatus of claim 6 wherein said minimum difference sensing means comprises means for summing the absolute difference determined for substantially all of the pixels in said particular block to provide a block difference value; and means for storing the block difference value having minimum value derived from substantially all of the rotations of said stored block.

8. The apparatus of claim 5 wherein said means for rotating each pixel comprises means for rotating said pixel to an angular location P which does not coincide with a pixel in said stored blocks; and means for deriving a value of the pixel rotated to said angular location P from stored pixels adjacent the location P.

9. Apparatus for use in a video compression system having a linear motion vector generator for generating motion vector data representing linear motion of video information from one video frame to another and intraframe spatial redundancy processor means for reducing video data representing the video information within a video frame, said apparatus comprising: zoom sensing means for sensing zoom-in and zoom-out of video information from a previous frame to a present frame; zoom vector generating means for generating zoom vector data representing a magnitude of the zoom sensed by said zoom sensing means; and means for combining the zoom vector data with said motion vector data.

10. The apparatus of claim 9 wherein said zoom sensing means comprises block segmenting means for segmenting a present video frame of pixels into blocks; storage means for storing blocks of pixels of a previous frame; means for modifying the stored blocks of a previous frame by a zoom factor; and comparing means for comparing the stored blocks of the previous frame modified by said zoom factor to the blocks of the present frame to sense zoom-in and zoom-out of respective blocks of said present frame.

11. The apparatus of claim 10 wherein said comparing means comprises search means for searching within a constrained search area the blocks of said previous frame, modified by said zoom factor; and determining means for determining when a particular block of said present frame matches a searched block of said previous frame, thereby sensing zoom-in or zoom-out of said particular block.

12. The apparatus of claim 11 wherein said search means comprises selecting means for selecting successive search blocks of pixels of said previous frame, each modified by said zoom factor, for comparison with said particular block of said present frame.

13. The apparatus of claim 12 wherein said determining means comprises means for comparing each pixel in said search block to a corresponding pixel in said particular block and means for producing difference data representing the differences between the compared pixels.

14. The apparatus of claim 13 wherein said selecting means comprises zoom factor means for selecting a zoom factor; search block selecting means for selecting a search block at a given location and of a size determined by said selected zoom factor; and reiterate means for reiterating the operation of said zoom factor means and said search block selecting means over a predetermined range of zoom factors and over said constrained search area, respectively.

15. The apparatus of claim 14 wherein said means for comparing and said means for producing difference data are operative for each iteration of said zoom factor means and said search block selecting means.

16. The apparatus of claim 15 wherein said zoom vector generating means comprises means for detecting the difference data having the least value produced for said reiterations of said zoom factor means and said search block selecting means, wherein the selected zoom factor which resulted in said difference data of minimum value represents said zoom vector.

17. The apparatus of claim 16 wherein said search block selecting means includes interpolating means for interpolating the pixels of the selected search block from the pixels of said stored block of said previous frame.

18. The apparatus of claim 17 wherein said interpolating means comprises means for modifying the size of a pixel of said stored block by said selected zoom factor; and means for deriving a value of the modified pixel from stored pixels adjacent thereto.

19. The apparatus of claim 18 wherein said means for producing difference data comprises means for determining an absolute difference between a pixel in said particular block and an interpolated corresponding pixel in said selected search block; and means for summing the absolute differences determined for all of the pixels in said particular block to produce said difference data.

20. Video motion vector detecting apparatus for detecting motion vectors from one video frame to another, comprising:

block segmenting means for segmenting a present frame of video data into plural blocks;

storage means for storing a preceding frame of video data;

search means for establishing a search block and for displacing said search block over a constrained portion of the stored preceding frame in rectilinear, rotational and zoom-in/zoom-out directions to search for a block of video data that most resembles a selected block segmented from said present frame; and means for producing motion vectors x, y, r and z corresponding to the rectilinear, rotational and zoom-in/zoom-out position of said search block that most resembles said selected block.

21. The apparatus of claim 20 wherein said search means comprises compare means for comparing the video data in said selected block to the video data in said search block, and means for sensing the least difference therebetween.

22. The apparatus of claim 21 wherein said video data comprises pixels, said compare means compares the pixels in said selected block to the pixels in said search block to produce a difference value, and said means for sensing determines the minimum difference value produced between said selected block and the search block after said search block has been displaced throughout said constrained portion.

23. The apparatus of claim 22 wherein said search means further comprises coordinate establishing means for establishing coordinates $x_m$, $y_n$, $r_\Theta$, $z_p$ to position said search block, wherein m and n are variable integers, $\Theta$ is a variable angle and p is a variable zoom factor, and means for selectively varying m, n, $\Theta$ and p.

24. The apparatus of claim 23 wherein said compare means comprises means for sensing an absolute difference in value between each pixel in said selected block and each corresponding pixel in said search block for given values of m, n, $\Theta$ and p, and means for summing the absolute differences to produce said difference value representing the difference between said selected block and said search block.

25. The apparatus of claim 24 wherein said means for sensing comprises difference value store means for storing the minimum difference values produced for each value of m, n, $\Theta$ and p as said search block is displaced.

26. The apparatus of claim 25 wherein said means for producing motion vectors x, y, r and z comprises means for identifying the values of m, n, $\Theta$ and p which define the position of the search block that results in the smallest of the stored difference values, and means for generating said motion vectors as a function of the identified values of m, n, $\Theta$ and p.

27. The apparatus of claim 23 wherein said compare means additionally includes interpolating means for interpolating pixel values in said search block when the coordinates $x_m$, $y_n$, $r_\Theta$, $z_p$ that position said search block are not in substantial registration with a block of stored video data.

28. The apparatus of claim 27 wherein said interpolating means comprises means for calculating the value of a pixel in said search block from the values of those pixels of said stored frame of video data which are adjacent said pixel in said search block.

29. The apparatus of claim 23 wherein said means for selectively varying m, n, $\Theta$ and p comprises means for establishing a hierarchical order of m, n, $\Theta$ and p from most significant factor to least significant factor, means for varying the least significant factor over a first range while maintaining the more significant factors constant, and means for reiterating the varying of said least significant factor after incrementing said more significant factors in reverse hierarchial order, thereby displacing said search block throughout said constrained portion.

30. A method for use in a video compression process in which linear motion of video information from one video frame to another is detected and motion vector data representative thereof is generated, and in which video data representing the video information within a video frame is reduced, said method comprising the steps of: sensing rotation of video information from a previous frame to a present frame; generating rotation vector data representing a magnitude of the sensed rotation; and combining said rotation vector data with said motion vector data.

31. The method of claim 30 wherein rotation is sensed by dividing a present video frame into a plurality of blocks, each block being formed of a two-dimensional array of pixels; and sensing the rotation of respective blocks of said present video frame relative to those blocks of said previous frame.

32. The method of claim 31 wherein said rotation vector data is generated by generating block rotation data representing the relative rotation of each said respective block in said present video frame.

33. The method of claim 32 wherein the rotation of respective blocks is sensed by storing the blocks of said previous video frame; searching the stored blocks within a constrained search area for a block that is substantially the same as a particular block in said present video frame; and determining the relative rotation of said particular block relative to the stored block that is substantially the same thereas.

34. The method of claim 33 wherein the step of searching the stored blocks comprises rotating each pixel in the two-dimensional array of pixels in a stored block by a first angular amount to angularly interpolate each said pixel; determining a difference between each angularly interpolated pixel in the stored block rotated by said first angular amount and substantially the same pixel in said particular block; reiterating the steps of interpolating and determining a difference successively for different angular amounts; sensing the minimum determined difference during the reiterations thereof; and identifying the angular amount which resulted in an angular interpolation that produced said minimum difference.

35. The method of claim 34 wherein the difference between each angularly interpolated pixel in the stored block rotated by said first angular amount and substantially the same pixel in said particular block is determined by determining an absolute difference between each said same pixel in said particular block and each said angularly interpolated pixel in said stored block for each rotation of said stored block.

36. The method of claim 35 wherein the minimum determined difference is sensed by summing the absolute difference determined for substantially all of the pixels in said particular block to provide a block difference value, and storing the block difference value having minimum value derived from substantially all of the rotations of said stored block.

37. The method of claim 34 wherein each pixel in the two-dimensional array is rotated by rotating a pixel to an angular location P which does not coincide with a pixel in said stored blocks, and deriving a value of the pixel rotated to said angular location P from stored pixels adjacent location P.

38. A method for use in a video compression process in which motion vector data representing linear motion of video information from one video frame to another is generated and video data representing the video information within a video frame is reduced, said method comprising the steps of: sensing zoom-in and zoom-out of video information from a previous frame to a present frame; generating zoom vector data representing a magnitude of the sensed zoom; and combining the zoom vector data with said motion vector data.

39. The method of claim 38 wherein the step of sensing zoom-in and zoom-out comprises segmenting a present video frame of pixels into blocks, storing blocks of pixels of a previous frame, and comparing the blocks of a previous frame modified by a zoom factor to the blocks of the present frame to sense zoom-in and zoom-out of respective blocks of said present frame.

40. The method of claim 39 wherein the step of comparing comprises searching within a constrained search area the blocks of said previous frame, modified by said zoom factor, and determining when a particular block of said present frame matches a searched block of said previous frame, thereby sensing zoom-in or zoom-out of said particular block.

41. The method of claim 40 wherein the step of searching within a constrained search area comprises selecting successive search blocks of pixels of said previous frame, each modified by said zoom factor, for comparison with said particular block of said present frame.

42. The method of claim 41 wherein the step of determining a match comprises comparing each pixel in a search block to a corresponding pixel in said particular block and producing difference data representing the differences between the compared pixels.

43. The method of claim 42 wherein the step of selecting successive search blocks of pixels of the previous frame comprises selecting a zoom factor, selecting a search block at a given location and of a size determined by said selected zoom factor, and reiterating the steps of selecting a zoom factor and selecting a search block at a given location and size over a predetermined range of zoom factors and over said constrained search area, respectively.

44. The method of claim 43 wherein the step of comparing each pixel in a search block to a corresponding pixel in said particular block and the step of producing difference data are carried out for each iteration of selecting a zoom factor and selecting a search block.

45. The method of claim 44 wherein the zoom vector data is generated by detecting the difference data having the least value produced for said reiterations of selecting a zoom factor and selecting a search block, whereby the selected zoom factor which resulted in said difference data of minimum value represents said zoom vector.

46. The method of claim 45 wherein the step of selecting the search block includes the step of interpolating the pixels of the selected search block from the pixels of said stored block of said previous frame.

47. The method of claim 46 wherein the step of interpolating comprises modifying the size of a pixel of said stored block by said selected zoom factor, and deriving a value of the modified pixel from stored pixels adjacent thereto.

48. The method of claim 47 wherein the step of producing difference data comprises determining an absolute difference between a pixel in said particular block and an interpolated corresponding pixel in said selected search block, and summing the absolute differences determined for all of the pixels in said particular block to produce said difference data.

49. A method of detecting video motion vectors from one video frame to another, comprising the steps of:

segmenting a present frame of video data into plural blocks;

storing a preceding frame of video data;

establishing a search block and displacing said search block over a constrained portion of the stored preceding frame in rectilinear, rotational and zoom-in/zoom-out directions to search for a block of video data that most resembles a selected block segmented from said present frame; and producing motion vectors x, y, r and z corresponding to the rectilinear, rotational and zoom-in/zoom-out position of said search block that most resembles said selected block.

50. The method of claim 49 further comprising the steps of comparing the video data in said selected block to the video data in said search block, and sensing the least difference therebetween.

51. The method of claim 50 wherein said video data comprises pixels, the pixels in said selected block are compared to the pixels in said search block to produce a difference value, and the minimum difference value produced between said selected block and the search block is determined after said search block has been displaced throughout said constrained portion.

52. The method of claim 51 wherein the step of displacing the search block includes establishing coordinates $x_m$, $y_n$, $r_\Theta$, $z_p$ to position said search block, wherein m and n are variable integers, $\Theta$ is a variable angle and p is a variable zoom factor, and means for selectively varying m, n, $\Theta$ and p.

53. The method of claim 52 further comprising the steps of sensing an absolute difference in value between each pixel in said selected block and each corresponding compared pixel in said search block for given values of m, n, $\Theta$ and p, and summing the absolute differences to produce said difference value representing the difference between said selected block and said search block.

54. The method of claim 53 wherein the least difference between the compared video data in the selected search blocks is produced by storing the minimum difference values produced for each value of m, n, Θ and p as said search block is displaced.

55. The method of claim 54 wherein motion vectors x, y, r and z are produced by identifying the values of m, n, Θ and p which define the position of the search block that results in the smallest of the stored difference values, and generating said motion vectors as a function of the identified values of m, n, Θ and p.

56. The method of claim 52 wherein the step of comparing the video data in the selected block to the video data in the search block includes interpolating pixel values in said search block when the coordinates $x_m, y_n, r_\Theta, z_p$ that position said search block are not in substantial registration with a block of stored video data.

57. The method of claim 56 wherein interpolation is carried out by calculating the value of a pixel in said search block from the values of those pixels of said stored frame of video data which are adjacent said pixel in said search block.

58. The method of claim 52 wherein the step of selectively varying m, n, Θ and p comprises the steps of means for establishing a hierarchical order of m, n, Θ and p from most significant factor to least significant factor, varying the least significant factor over a first range while maintaining the more significant factors constant, and reiterating the varying of said least significant factor after incrementing said more significant factors in reverse hierarchial order, thereby displacing said search block throughout said constrained portion.

* * * * *